(12) United States Patent
Tackett et al.

(10) Patent No.: US 9,950,350 B2
(45) Date of Patent: Apr. 24, 2018

(54) SYSTEM FOR COATING REMOVAL

(71) Applicant: Geo-Tech Polymers, LLC, Westerville, OH (US)

(72) Inventors: Dennis Tackett, Chillicothe, OH (US); Douglas R. Gels, Lewis Center, OH (US); Kenneth J. Heater, Delaware, OH (US)

(73) Assignee: GEO-TECH POLYMERS, LLC, Westerville, OH (US)

( * ) Notice: Subject to any disclaimer, the term of this patent is extended or adjusted under 35 U.S.C. 154(b) by 0 days.

(21) Appl. No.: 14/830,529

(22) Filed: Aug. 19, 2015

(65) Prior Publication Data

US 2016/0052024 A1 Feb. 25, 2016

Related U.S. Application Data

(60) Provisional application No. 62/039,269, filed on Aug. 19, 2014.

(51) Int. Cl.
*B08B 3/10* (2006.01)
*B08B 3/14* (2006.01)
*C09D 9/00* (2006.01)

(52) U.S. Cl.
CPC .................. *B08B 3/10* (2013.01); *B08B 3/14* (2013.01); *C09D 9/00* (2013.01)

(58) Field of Classification Search
CPC .. B29B 17/02; Y02W 30/622; B29K 2023/06; B08B 3/14; C09D 9/00

(Continued)

(56) References Cited

U.S. PATENT DOCUMENTS 3,109,439 A * 11/1963 Evans ..................... B44D 3/16
118/70
4,025,609 A 5/1977 Matsunaga
(Continued)

FOREIGN PATENT DOCUMENTS

CN 102443804 5/2012
EP 2832459 2/2015
(Continued)

OTHER PUBLICATIONS

Written Opinion and International Search Report issued in PCT/US15/45932, dated Nov. 23, 2015.
(Continued)

*Primary Examiner* — David Cormier
*Assistant Examiner* — Thomas Bucci
(74) *Attorney, Agent, or Firm* — Benesch, Friedlander, Coplan & Aronoff LLP

(57) ABSTRACT

Various embodiments of a system for coating removal are provided. In one embodiment, a system for removing a coating material from another material is provided, the system comprising: a staging hopper; a second elevator operatively connecting the staging hopper to the decoating mill; a decoating mill having a decoating mill tank and at least one rotary blade oriented within the decoating mill tank, wherein the at least one rotary blade can translate horizontally and vertically; a screen station having a dump hopper and a recovery tank; a washer; a dryer; an aspirator; a large waste water filter press; at least one process water filter press; a sanitary water filter; a staging tank; a water heater; and a process chemical feed system.

21 Claims, 31 Drawing Sheets

(58) Field of Classification Search
USPC .... 241/20, 23, 19, DIG. 38, 29, 79.1, 24.28, 241/260.1; 134/109, 26, 38, 10, 100.1, 134/104.2, 104.4, 105, 107, 108, 110, 134/111; 264/115, 920, 141, 211.21, 264/37.1, 39
See application file for complete search history.

(56) References Cited

U.S. PATENT DOCUMENTS

| | | | |
|---|---|---|---|
| 4,240,921 A | | 12/1980 | Kaniecki |
| 4,340,076 A | * | 7/1982 | Weitzen .................... B29B 7/82 137/13 |
| 5,230,473 A | | 7/1993 | Hagguist et al. |
| 5,240,530 A | | 8/1993 | Fink |
| 5,277,758 A | * | 1/1994 | Brooks ..................... B03B 1/04 162/191 |
| 5,323,971 A | * | 6/1994 | Nishibori ................ B02C 2/042 241/152.2 |
| 5,331,087 A | * | 7/1994 | Menges .................. B03B 9/061 162/119 |
| 5,346,955 A | | 9/1994 | Sasse et al. |
| 5,443,772 A | * | 8/1995 | Inoue .................... B29B 17/02 241/17 |
| 5,628,832 A | | 5/1997 | Graham et al. |
| 5,634,405 A | | 6/1997 | Bose |
| 5,743,568 A | | 4/1998 | Smith, III |
| 5,779,909 A | | 7/1998 | Tomita |
| 5,957,295 A | * | 9/1999 | Neureither ................ B03B 5/32 209/3 |
| 6,138,929 A | * | 10/2000 | Montgomery .......... B29B 17/02 241/20 |
| 6,663,929 B1 | | 12/2003 | Tabota |
| 6,664,220 B2 | | 12/2003 | Mayhall |
| 6,777,067 B1 | | 8/2004 | Speith-Herfurth |
| 7,014,132 B2 | * | 3/2006 | Vandeputte ............... B03B 5/28 209/3 |
| 7,255,112 B2 | | 8/2007 | Geret |
| 7,608,573 B1 | | 10/2009 | Scheuing |
| 7,744,701 B1 | | 6/2010 | Montle |
| 7,879,155 B1 | | 2/2011 | Montie |
| 8,186,872 B2 | * | 5/2012 | Bartholomew ....... G07F 11/165 366/273 |
| 8,278,257 B2 | | 10/2012 | Hawes et al. |
| 8,617,317 B1 | | 12/2013 | Levitt |
| 8,859,483 B2 | | 10/2014 | Shell |
| 9,114,551 B2 | | 8/2015 | Kulesa et al. |
| 9,616,595 B2 | | 4/2017 | Fullana Font et al. |
| 2001/0056047 A1 | | 12/2001 | Meine et al. |
| 2002/0068684 A1 | | 6/2002 | Peters et al. |
| 2002/0077259 A1 | | 6/2002 | Skee |
| 2003/0148905 A1 | | 8/2003 | Matson |
| 2004/0026665 A1 | | 2/2004 | Griese et al. |
| 2005/0065055 A1 | | 3/2005 | Barnes |
| 2006/0089281 A1 | | 4/2006 | Gibson |
| 2007/0037724 A1 | | 2/2007 | Yoshikawa et al. |
| 2009/0131560 A1 | | 5/2009 | Ono |
| 2009/0286892 A1 | | 11/2009 | Isozaki |
| 2010/0097082 A1 | | 4/2010 | Panotopoulos |
| 2010/0236582 A1 | | 9/2010 | Heintz et al. |
| 2010/0317559 A1 | | 12/2010 | Ryther |
| 2011/0044919 A1 | | 2/2011 | Giacomoni |
| 2011/0048458 A1 | * | 3/2011 | Takahashi .............. B01D 21/02 134/10 |
| 2011/0266496 A1 | | 11/2011 | Mitsuda et al. |
| 2011/0318557 A1 | | 12/2011 | Mitchell |
| 2012/0015857 A1 | | 1/2012 | Chen et al. |
| 2012/0282433 A1 | | 11/2012 | Agarwal |
| 2013/0005626 A1 | | 1/2013 | Breitzke et al. |
| 2013/0072419 A1 | | 3/2013 | Blattner et al. |
| 2013/0216734 A1 | | 8/2013 | Van Pottelbergh et al. |
| 2013/0264734 A1 | * | 10/2013 | Katoh ................. B29B 17/0412 264/37.1 |
| 2014/0038878 A1 | | 2/2014 | O'Connell et al. |
| 2014/0069587 A1 | | 3/2014 | Rackovan et al. |
| 2014/0220336 A1 | | 8/2014 | Chen et al. |
| 2014/0352740 A1 | | 12/2014 | Hunt |
| 2015/0021422 A1 | | 1/2015 | Hall et al. |
| 2015/0119312 A1 | | 4/2015 | Sanders |
| 2015/0298360 A1 | | 10/2015 | Fullana Font |

FOREIGN PATENT DOCUMENTS

| | | |
|---|---|---|
| JP | 8134386 | 5/1996 |
| WO | 9313940 | 7/1993 |
| WO | 2012123814 | 9/2012 |
| WO | 2014005537 | 1/2014 |
| WO | 2016028920 | 2/2016 |

OTHER PUBLICATIONS

Written Opinion and International Search Report issued in PCT/US15/45937, dated Nov. 24, 2015.
Written Opinion and International Search Report issued in PCT/US15/45941, dated Nov. 24, 2015.
Written Opinion and International Search Report issued in PCT/US15/45943, dated Nov. 24, 2015.
Written Opinion and International Search Report issued in PCT/US16/057944, dated Mar. 13, 2017.
Written Opinion and International Search Report issued in PCT/US16/057950, dated Mar. 3, 2017.
(Donermeyer, D et al.) Laboratory and pilot-scale recycling of benign pressure sensitive adhesive stamp materials, 5th International Recycling Technology Conference, Feb. 9, 1998; pp. 1-4, 6-8, 10, 13, 24-25.
(Venditti, et al.) The effect of release liner materials on adhesive contaminants, paper recycling and recycled paper properties, 2000 Tappi Recycling Symposium, vol. 2, pp. 579-592, 2000; p. 580.
Third Party Submission filed U.S. Appl. No. 15/049,105 dated Feb. 24, 2017.
Third Party Submission filed U.S. Appl. No. 15/049,106 dated Feb. 24, 2017.
Third Party Submission filed U.S. Appl. No. 15/049,107 dated Feb. 24, 2017.

* cited by examiner

| | | | |
|---|---|---|---|
| Save New Recipe | | Prev Recipe | |
| Recipe Name: Test 1 | | Next Recipe | |
| Author: SCADA Developer | | Load PLC Recipe | Recipe 5 |
| Last Modified By: SCADA Developer | | | |
| Last Update Time: 02:26 PM | | | Batch Start |
| Last Update Date: 7/3/2013 | | | |
| Caustic to Add | ◄◄ Value: 8.0 % PLC: 8.0 % ►► | Shaft Horizontal Start Pos | ◄◄ Value: 2.1 in PLC: 8.7 in ►► |
| Chemical A to Add | ◄◄ Value: 9.0 % PLC: 9.0 % ►► | Shaft Vertical Start Pos | ◄◄ Value: 5.5 in PLC: 2.3 in ►► |
| Chemical B to Add | ◄◄ Value: 10.0 % PLC: 10.0 % ►► | Precharge Water | ◄◄ Value: 0.0 Gal PLC: 61.0 Gal ►► |
| Chemical C to Add | ◄◄ Value: 11.0 % PLC: 10.0 % ►► | Water Charge | ◄◄ Value: 500.0 Gal PLC: 68.0 Gal ►► |
| Chemical D to Add | ◄◄ Value: 12.0 % PLC: 11.0 % ►► | Plastic Weight | ◄◄ Value: 235.0 Lbs PLC: 235.0 Lbs ►► |
| Chemical E to Add | ◄◄ Value: 4.0 % PLC: 11.0 % ►► | Feed Conveyor Speed | ◄◄ Value: 75 % PLC: 50 ►► |
| Chemical F to Add | ◄◄ Value: 5.0 % PLC: 12.0 % ►► | Slow Cage Speed | ◄◄ Value: 30 % PLC: 30 ►► |
| Chemical G to Add | ◄◄ Value: 2.0 % PLC: 13.0 % ►► | Rotary Valve Speed | ◄◄ Value: 80 % PLC: 30 ►► |

FIG. 6A

| System Parameters | |
|---|---:|
| Parameter | Value |
| Mill Water SP | 0.0 Gal |
| Mill Water Dribble | 0.0 Gal |
| Water Needed to Drop | 0.0 Gal |
| Cooling Start Temp | 50.0 F |
| Horiz. Position SP | 16.0 In |
| Vert. Position SP | 0.0 In |
| Drop Setpoint | 0.0 lbs |
| Max Mill Hdr Difference | 0.10000 In |
| Max Mill Hdr Diff Reset | 0.0000 In |
| Flow to Presses SP | 26.0 GPM |
| C0501 LP Track SP | 54.0% |
| C0509 LP Track SP | 50.0% |
| FW Tank SP | 100.0 In |
| Hot Water Fill Level | 120.0 In |
| A0912_LP_SP | 102.0 In |
| PW Level SP | 100.0 In |
| Sump Refill SP | 8.0 In |
| Sump Pump Down SP | 4.0 In |
| FP Flush SP | 49.0 Gal |
| FP Switch Tanks SP | 22.5 Gal |
| FP Rotate SP | 500.0 Gal |
| FP Flow SP | 10.0 Gal |
| C1302 Ph Alarm Light | 11.0 Ph |
| C1302 Ph Clear Level | 9.0 Ph |
| C1301 Hi Flow Limit | 25 GPM |
| C1301 Hi Flow OK | 16 GPM |

FIG. 7A

| System Parameters | |
|---|---|
| *Parameter* | *Value* |
| Quick Mix Time | 5 Sec |
| Chemical A Cal SP | 0.0 lbs |
| Chemical B Cal SP | 0.0 lbs |
| Chemical C Cal SP | 50.0 F |
| Chemical D Cal SP | 0.0 lbs |
| Chemical E Cal SP | 0.0 lbs |
| Chemical F Cal SP | 0.0 lbs |
| Caustic Bin Empty | 4.0 lbs |
| GTB Min Flow | 14.0 GPM |
| GTB Dribble | 0.0 Gal |
| GTB Cal. SP | 62.0 Gal |
| A0301-VFD Default SP | 100% |
| A0501-VFD Default SP | 100% |
| A0702-VFD Default SP | 75% |
| A0704-VFD Default SP | 73% |
| A0717-VFD Default SP | 36% |
| A0766-VFD Default SP | 100% |
| A0916-VFD Default SP | 100% |
| A1101-VFD Default SP | 80% |
| A1103-VFD Default SP | 100% |
| A1201-VFD Default SP | 100% |
| A1303-VFD Default SP | 100% |
| A1401-VFD Default SP | 75% |
| B0201-VFD Default SP | 50% |
| B0301-VFD Default SP | 100% |
| B0401-VFD Default SP | 100% |
| B0501-VFD Default SP | 100% |
| C0603-VFD-Default SP | 50% |
| C1101-VFD Default SP | 100% |
| C1201-VFD Default SP | 100% |
| C1202-VFD Default SP | 75% |
| C1212-VFD Default SP | 50% |
| D0704-VFD Default SP | 50% |

FIG. 7B

SYSTEM FOR COATING REMOVAL

CROSS-REFERENCE TO RELATED APPLICATIONS

This application claims priority from U.S. Provisional Patent Application No. 62/039,269, filed on Aug. 19, 2014, which is incorporated by reference herein in its entirety.

BACKGROUND

Many products, including consumer goods, technology devices, food industry containers, and the like include a recyclable polymeric material plated, painted, adhered, dyed, covered in part with ink, or otherwise coated with another material. Examples of consumer goods may include toys, household items, kitchen products, and the like. Examples of technology devices may include compact discs, digital video discs, and the like. Food industry containers may include food containers, beverage containers, and the like. Plating materials may include metals, including electroplating of materials used in electronic media, decorative items, and the like. Painting materials may include paints as typically used in products to decorate, color, label, mark, differentiate, and the like. Adhesive materials may include glues, cements, bonding agents, or the like. Inks may include general inks used to provide labeling, information, mark, differentiate, and the like.

Recyclable polymer materials coated with a coating material may not be easily recyclable due to the presence of the other material. The coating material may be separated recyclable or non-recyclable. The coating material may need to be removed from the polymeric material in order to effect recycling of the polymeric material, the coating material, or both. Physically removing a coating material from a polymeric material in order to recycle the polymeric material may be at the very least impractical, if not very difficult. As a result, coated polymeric materials may be discarded rather than recycled, simply because recycling of these materials may not be cost-effective.

Alternatively, it may be desirable to remove a coating from a material for any of a variety of reasons, not limited to recycling of either of the materials.

What is needed is a system for removing a coating from a material, including a material to be recycled.

SUMMARY

In one embodiment, a system for removing a coating material from another material is provided, the system comprising: a staging hopper; a second elevator operatively connecting the staging hopper to the decoating mill; a decoating mill having a decoating mill tank and at least one rotary blade oriented within the decoating mill tank, wherein the at least one rotary blade can translate horizontally and vertically; a screen station having a dump hopper and a recovery tank; a washer; a dryer; an aspirator; a large waste water filter press; at least one process water filter press; a sanitary water filter; a staging tank; a water heater; and a process chemical feed system.

In another embodiment, a system for removing a coating material from another material is provided, the system comprising: a staging hopper; a second elevator operatively connecting the staging hopper to the decoating mill; a decoating mill having a decoating mill tank and at least one rotary blade oriented within the decoating mill tank; a screen station having a dump hopper, a recovery tank, and a dewatering screen, wherein the dump hopper and the recovery tank are separated from one another by a diagonally-extending wall; a washer; a dryer; an aspirator; a large waste water filter press; at least one process water filter press; a sanitary water filter; a staging tank; a water heater; and a process chemical feed system.

In another embodiment, a system for removing a coating material from another material is provided, the system comprising: a staging hopper; a second elevator operatively connecting the staging hopper to the decoating mill; a decoating mill having a decoating mill tank and at least one rotary blade oriented within the decoating mill tank, wherein the at least one rotary blade can translate horizontally and vertically; a screen station having a dump hopper and a recovery tank; a washer; a dryer; an aspirator; a large waste water filter press; at least one process water filter press; a sanitary water filter; a water separation system; a staging tank; a water heater; and a process chemical feed system.

In another embodiment, a system for removing a coating material from another material is provided, the system comprising: a staging hopper; a second elevator operatively connecting the staging hopper to the decoating mill; a decoating mill having a decoating mill tank and at least one rotary blade oriented within the decoating mill tank; a screen station having a dump hopper, a recovery tank, and a dewatering screen, wherein the dump hopper and the recovery tank are separated from one another by a diagonally-extending wall; a washer; a dryer; an aspirator; a large waste water filter press; at least one process water filter press; a sanitary water filter; a water separation system; a staging tank; a water heater; and a process chemical feed system.

BRIEF DESCRIPTION OF THE DRAWINGS

The accompanying figures, which are incorporated in and constitute a part of the specification, illustrate various example systems and configurations, and are used merely to illustrate various example embodiments. In the figures, like elements bear like reference numerals.

FIG. 6A illustrates a partial view of a control screen view used in a system for removing a coating material from another material.

FIG. 7A illustrates a partial view of a control screen view used in a system for removing a coating material from another material.

FIG. 7B illustrates a partial view of a control screen view used in a system for removing a coating material from another material.

DETAILED DESCRIPTION

Figure 1:
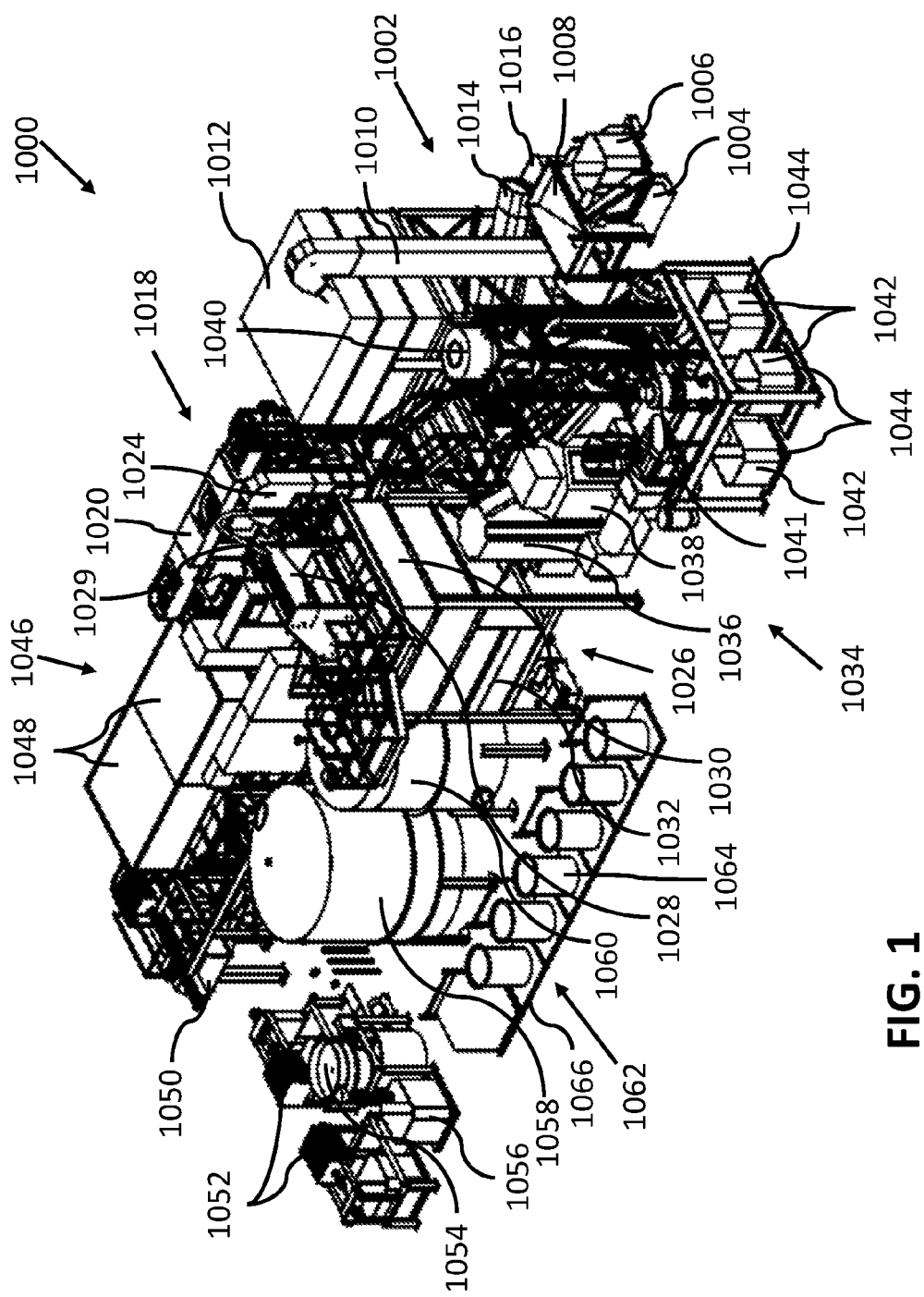
FIG. 1 illustrates a perspective view of a system 1000 for removing a coating material from another material.

FIG. 1 illustrates a perspective view of a system 1000 for removing a coating material from another material.

System 1000 may include a loading station 1002. Loading station 1002 may be configured to accept coated material to be introduced to system 1000. The coated material may include a polymeric substrate. The coated material may include a polymeric film. The coated material may include a shredded polymeric film. The coated material may include sheets of polymeric film. The coated material may be broken into smaller, more manageable pieces than their original forms. The coated material may be at least one of flaked, crushed, shredded, chipped, ground, and the like. The coated material may be processed into a small particle between about 0.5 mm and about 20.0 mm in size. The coated material may be processed into a small particle between about 1.0 mm and about 10.0 mm in size. The coated material may be processed into a small particle between about 4.0 mm and about 8.0 mm in size. The coated material may be smaller than 0.5 mm, larger than 20.0 mm, or comprise particles of varying sizes inside or outside the range recited. The coated material may be sorted such that the coated material is all of the same or similar type, composition, nature, or the like.

The coated material may be coated with any of a variety of materials, including for example: plating, paint, adhesives, dyes, ink, labels, and the like. The coated material may be coated on at least one surface. The coated material may be coated on multiple surfaces.

Loading station 1002 may include a loading device 1004. Loading device 1004 may be configured to introduce coated material into system 1002. Loading device 1004 may be configured to load or dump containers of coated material into system 1002. Loading device 1004 may include any of a variety of devices, including a box dumper. Loading device 1004 may include a Gaylord Box Dumper.

The coated material may be introduced into system 1000 and loading station 1002 in a container 1006. Container 1006 may include any box, bag, crate, pallet, or other container capable of holding the coated material. Container 1006 may be a Gaylord Box.

Loading station 1002 may include a loading hopper 1008. Loading hopper 1008 may be configured to receive coated material introduced to loading station 1002. Loading device 1004 may dump the contents of container 1006 into loading hopper 1008. Loading hopper 1008 may be gravity fed from the top with coated material selectively allowed to exit it from its bottom, side, or the like.

At least one of loading device 1004 and loading hopper 1008 may include a scale configured to measure the weight or mass of the coated material introduced in a given batch. At least one of loading device 1004 and loading hopper 1008 may include a scale configured to limit the weight or mass of the coated material introduced in a given batch.

Loading station 1002 may include a first elevator 1010. First elevator 1010 may be a bucket elevator device configured to receive coated material at a first point and transfer the coated material to a second point above the first point. First elevator 1010 may be any elevator device, including a bucket elevator, auger elevator, belt elevator, and the like. Loading hopper 1008 and staging hopper 1012 may be operatively connected by first elevator 1010.

Loading station 1002 may include a staging hopper 1012. First elevator 1010 may be configured to transfer the coated material from loading hopper 1008 to staging hopper 1012. Staging hopper 1012 may be configured to receive coated material introduced to loading station 1002. Staging hopper 1012 may be gravity fed from the top with coated material selectively allowed to exit it from its bottom, side, or the like. Staging hopper 1012 may include a scale configured to measure the weight or mass of the coated material introduced in a given batch. Staging hopper 1012 may include a scale configured to limit the weight or mass of the coated material introduced in a given batch.

An offloading system 1014 may be operatively connected to staging hopper 1012 to allow for selective offloading of coated material from staging hopper 1012. Staging hopper 1012 may be at least partially offloaded in the event that more coated material than desired is introduced to staging hopper 1012. Staging hopper 1012 may be at least partially offloaded in the case of an emergency. Staging hopper 1012 may be at least partially offloaded in the event that maintenance needs to be performed on system 1000, loading station 1002, or staging hopper 1012. Offloading system 1014 may include a conveyor configured to receive coated material from staging hopper 1012. Offloading system 1014 may include any device configured to transport material, including for example a conveyor belt, an auger, and the like. Offloading system 1014 may deposit material in a container 1016. Container 1016 may include any box, bag, crate, pallet, or other container capable of holding the coated material. Container 1016 may be a Gaylord Box. System 1000 and/or staging hopper 1012 may include a control preventing offloading of coated material from staging hopper 1012 via offloading system 1014 during loading of coated material into staging hopper 1012 via first elevator 1010.

System 1000 may include a decoating mill 1018. Decoating mill 1018 may include a tank configured to receive a coated material. Decoating mill 1018 may include a tank configured to receive a liquid, such as water. The liquid may be a heated liquid. The liquid may be heated to between about 82° C. (180° F.) and about 93° C. (200° F.). Decoating mill 1018 may include a tank configured to receive decoating chemicals. Decoating mill 1018 may include a tank configured to receive a mixture of at least two of a coated material, a liquid, and a decoating chemical. Decoating mill 1018 may include a tank configured to receive a slurry including a coated material and a liquid, and optionally a decoating chemical. Decoating mill 1018 may accept coated material and mix it with a liquid to decoat the coated material. Decoating mill 1018 may accept coated material and mix it with a liquid and at least one decoating chemical to decoat the coated material. Decoating mill 1018 may accept coated material slurry and mix it in high shear conditions in order to effect removal of the coatings from the coated materials.

Decoating mill 1018 may include a tank that may be first loaded with heated liquid, such as heated water. Coated material in particle form may be added to decoating mill 1018 tank and to the heated liquid. Finally, any required chemicals may be added to the mixture within the decoating mill 1018 tank.

Decoating mill 1018 may include at least one rotary blade extending into the tank. Decoating mill 1018 may include two rotary blades. Decoating mill 1018 may include three rotary blades.

Decoating mill 1018 may include a plurality of rotary blades having different diameters. Decoating mill 1018 may include a first rotary blade having a diameter of about 81.3 cm (32.0 in.). Decoating mill 1018 may include a second rotary blade and a third rotary blade each having a diameter of about 71.1 cm (28.0 in.). Decoating mill 1018 may include rotary blades having any of various diameters. The one or more rotary blade may have any of a variety of diameters.

Decoating mill 1018 may include rotary blades having shafts configured to extend the rotary blades into the tank. At least one of the rotary blades may be configured to move relative to the tank in a horizontal direction. At least one of the rotary blades may be configured to translate up to about 45.7 cm (18.0 in.) relative to the tank in a horizontal direction. At least one of the rotary blades may be configured to move relative to the tank in a vertical direction. At least one of the rotary blades may be configured to translate up to about 121.9 cm (48.0 in.) relative to the tank in a vertical direction. The one or more rotary blade may be configured to move in any of a variety of distances either vertically or horizontally.

Movement of at least one of the rotary blades vertically and/or horizontally relative to the interior of the tank may change a mixing vortex experienced by the coated material slurry within the tank. Depending upon the nature, size, quantity, and mixture of the coated material and coated material slurry, at least one of the rotary blades may be moved vertically and/or horizontally relative to the interior of the tank to achieve a desired mixing vortex.

Decoating mill 1018 may include at least one motor operatively connected to the one or more rotary blade to effect rotation of the one or more rotary blade. Decoating mill 1018 may include at least one motor operatively connected each of the one or more rotary blade to effect rotation of the one or more rotary blade. The at least one motor may include a horsepower of about 300 hp. The at least one motor may have any of a variety of horsepowers. Decoating mill 1018 may include a variable frequency drive. Decoating mill 1018 may include a variable frequency drive operatively connected to the one or more rotary blade. The variable frequency drive may permit adjustment of the RPM of at least one of the one or more rotary blade. System 1000 may gather data from the at least one motor, including torque, and may adjust the one or more rotary blade's RPM as necessary to effect proper mixing of the coated material slurry.

Decoating mill 1018 may include an inspection port on the side of its tank. The inspection port may be about 5.1 cm (2.0 in.) in diameter and about 15.2 cm (6.0 in.) in length to permit an operator of system 1000 to obtain a sample of the coated material slurry within decoating mill 1018. Inspection port may include any of a variety of dimensions as necessary to obtain a sample of the coated material slurry within decoating mill 1018.

Decoating mill 1018 may include a drive system 1020 including the at least one motor. Drive system 1020 may at least one actuator configured to effect movement of the one or more rotary blade horizontally or vertically relative to the tank.

Decoating mill 1018 may include a second elevator 1024. Second elevator 1024 may be a bucket elevator device configured to receive coated material at a first point and transfer the coated material to a second point above the first point. Second elevator 1024 may be any elevator device, including a bucket elevator, auger elevator, belt elevator, and the like. Second elevator 1024 may transport coated material from staging hopper 1012 to decoating mill 1018. System 1000 and/or staging hopper 1012 may include a control preventing transfer of coated material from staging hopper 1012 to decoating mill 1018 via second elevator 1024 during loading of coated material into staging hopper 1012 via first elevator 1010. Second elevator 1024 may operatively connect staging hopper 1012 to decoating mill 1018.

System 1000 may include a screening station 1026. Following successful and/or satisfactory decoating of the coated material within decoating mill 1018, the decoated slurry may be transferred to screen station 1026. This transfer may be referred to as a "pump over." Upon successful and/or satisfactory decoating of the coated material within decoating mill 1018, the decoated slurry, which may be a mixture of a liquid, a decoated material, a coating, and optionally at least one chemical, may be transferred to screening station 1026. The decoated slurry may be introduced to a dewater screen 1028. A transfer pipe 1029 may effect the transfer of the decoated slurry from decoating mill 1018 to dewater screen 1028. The decoated slurry may be pumped from decoating mill 1018 to dewater screen 1028. Dewater screen 1028 may be oriented vertically above a split tank having a diagonally-extending wall separating an upper portion of the tank and a lower portion of the tank. The upper portion may be a dump hopper 1030 while the lower portion may be a recovery tank 1032. In practice, the decoated slurry may be introduced to dewater screen 1028 wherein at least a portion of process liquid from the decoated slurry may be separated from the decoated slurry. The diagonally-extending wall separating dump hopper 1030 from recovery tank 1032 may include a screen configured to capture at least a portion of the decoated material in dump hopper 1030 while allowing at least a portion of the coating and any liquid and/or chemical, the collection of which is referred to as a "sludge" to continue downward to recovery tank 1032. The screen may be configured to capture the majority of the decoated material in dump hopper 1030 while allowing the majority of the sludge to pass through to recovery tank 1032.

Process water recovered in recovery tank 1032 may optionally be directed to the decoating mill 1018 tank during pump over operations. The pump over operation may require additional fluid in the decoating mill 1018 tank so as to permit efficient transfer of the decoated slurry to screening station 1026.

Dump hopper 1030 may be gravity fed from the top with decoated material selectively allowed to exit it from its bottom, side, or the like.

System 1000 may include a wash station 1034. Wash station 1034 may include a washer 1036. Decoated material captured in dump hopper 1030 may be fed to washer 1036. Washer 1036 may apply a clean liquid, such as water, to the decoated material. Washer 1036 may rinse the decoated material to further separate any residual sludge from the decoated material.

Wash station 1034 may include a dryer 1038. The decoated material may be directed from washer 1036 to dryer 1038. Dryer 1038 may dry the decoated material through separation of at least a portion of the liquid from the decoated material. Dryer 1038 may dry the decoated material through separation of most of the liquid from the decoated material. Dryer 1038 may dry the decoated material through evaporation of at least a portion of the liquid on the decoated material. Dryer 1038 may dry the decoated material through evaporation of most of the liquid on the decoated material.

Wash station 1034 may include an aspirator 1040. Decoated material may be transferred from dryer 1038 to aspirator 1040 via a pipe, auger, conveyer, or the like. Decoated material may be transferred from dryer 1038 to aspirator 1040 via any of a variety of means. Decoated material may be further separated from any other materials in aspirator 1040. Decoated material may be a polymeric material, and coating may be a metal. Aspirator 1040 may further separate any residual metals from the decoated material. Aspirator 1040 may collect and/or discard residual materials, including residual metals, thus leaving an almost homogenous collection of decoated material. Aspirator 1040 may pass the decoated material near a magnet 1041 to further separate any metals attracted to a magnetic field.

Decoated material may pass out of aspirator 1040 and into one or more collection container 1042. System 1000 may include a control that permits selective filling of one or more collection container 1042. One or more collection container 1042 may be placed upon a scale 1044 so as to measure the quantity of decoated material within collection container 1042 to prevent overfilling of collection container, fill specific orders of decoated material, and the like. Each of one or more collection container 1042 may rest upon an individual scale 1044. Upon reaching a desired weight, a filled collection container 1042 can be removed from system 1000 and prepared for transport, further recycling, further processing, and the like. An empty collection container 1042 can be substituted for a removed collection container 1042. System 1000 can direct flow of decoated material to other collection containers 1042 during exchange of a filled collection container 1042 for an empty collection container 1042. System 1000 may automatically switch output of decoated material between collection containers 1042 based on weight of collection containers 1042.

System 1000 may include a waste water treatment station 1046. Waste water treatment station 1046 may include at least one settling tank 1048. Sludge from recovery tank 1032 may be transported to settling tank 1048. Sludge from recovery tank 1032 may be pumped to settling tank 1048. Sludge from recovery tank 1032 may be transported to settling tank 1048 via any of a variety of methods, including a conveyor, an auger, and the like.

Sludge may be allowed to settle in settling tank 1048 into its solid and liquid components, namely coating and processing liquid/chemicals.

Waste water treatment station 1046 may include a large waste water filter press 1050. Coating allowed to settle in settling tank 1048 may be directed to large waste water filter press 1050. Large waste water filter press 1050 may include a plurality of filter panels into which the coating is passed. The filter panels may be pressed together to further separate any liquids from the coating. The filtered coating may be removed from large waste water filter press 1050 and system 1000 for further processing or discarding. Sludge from recovery tank 1032 may be transported directly to large waste water filter press 1050.

Waste water treatment station 1046 may include at least one process water filter press 1052. At least one process water filter press 1052 may filter process water from at least one of settling tank 1048, large waste water filter press 1050, washer 1036, dryer 1038, and recovery tank 1032. At least one process water filter press 1052 may filter process water and allow recycling of process water back into the remainder of system 1000. At least one process water filter press 1052 may include a plurality of filter panes into which the process water is passed. The filter panels may be pressed together to extract any contaminants from the process water. Contaminants may be removed from the filter panels for further processing or discarding.

Waste water treatment station 1046 may include a sanitary water filter 1054. Sanitary water filter 1054 may collect and process any drainage water from system 1000. Sanitary water filter 1054 may receive liquid from at least one of settling tank 1048, large waste water filter press 1050, washer 1036, and dryer 1038. Sanitary water filter 1054 may collect fines from liquids used in system 1000. Contaminants removed during filtering in sanitary water filter 1054 may be collected in a container 1056 for removal or further processing.

System 1000 may include a staging tank 1058. Staging tank 1058 may be a tank configured to contain a liquid, such as water. Staging tank 1058 may store a filtered water. Water from staging tank 1058 may be transported via pipes or other tubing to at least one of a heating tank 1060, decoating mill 1018, recovery tank 1032, and washer 1036.

Heating tank 1060 may include a tank configured to contain a liquid, such as water. Heating tank 1060 may be configured to heat a liquid, such as water. Heating tank 1060 may use any of a variety of means to heat a liquid, including electric heating elements, gas heating elements, and the like. Heating tank 1060 may heat a liquid, such as water, to between about 82° C. (180° F.) and about 93° C. (200° F.). Heating tank 1060 may receive liquid from at least one process water filter press 1052. Heating tank 1060 may receive liquid from staging tank 1058.

System 1000 may include a process chemical feed system 1062. Process chemical feed system 1062 may contain any of a variety of chemicals required or desired for decoating a material in decoating mill 1018. Process chemical feed system 1062 may pump chemicals from at least one chemical storage container 1064. At least one chemical storage container 1064 may rest upon a scale 1066. Scale 1066 may be utilized to measure the amount of chemical transferred from at least one chemical storage container 1064 to decoating mill 1018 in a given operation. System 1000 may monitor the weight of chemical subtracted during chemical transfer and stop the flow of chemical once a desired amount has been transferred.

Figure 2:
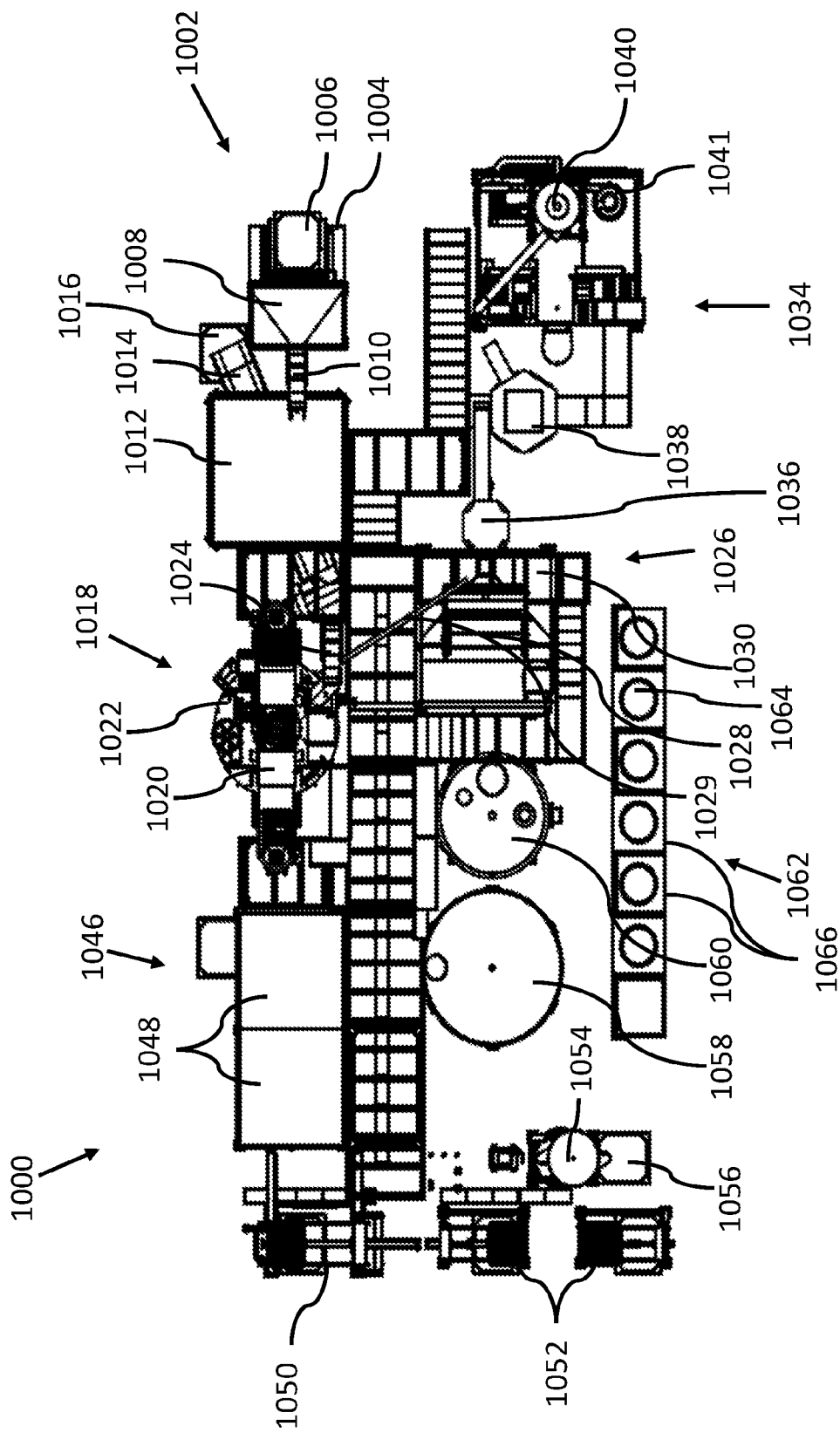
FIG. 2 illustrates a plan view of system 1000 for removing a coating material from another material.

FIG. 2 illustrates a plan view of system 1000 for removing a coating material from another material. As more clearly illustrated in FIG. 2, decoating mill 1018 may include a decoating mill tank 1022. Decoating mill tank 1022 may contain the coated material, liquid, and optionally chemicals using during the decoating process.

Figure 3:
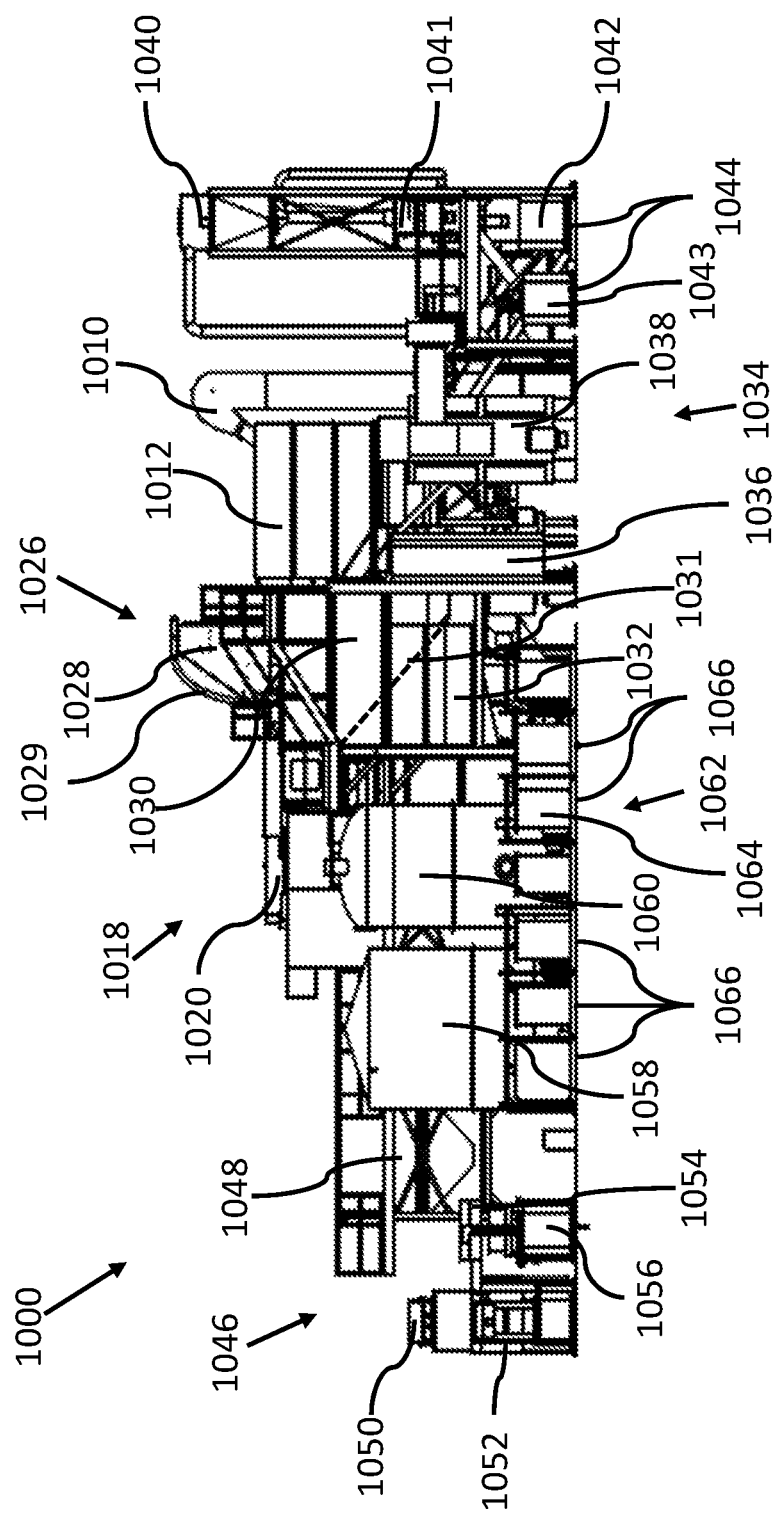
FIG. 3 illustrates a side view of system 1000 for removing a coating material from another material.

FIG. 3 illustrates a side view of system 1000 for removing a coating material from another material. As more clearly illustrated in FIG. 3, screening station 1026 may include a diagonally-extending wall 1031 separating dump hopper 1030 from recovery tank 1032. Diagonally-extending wall 1031 may include a screen.

Figure 4:
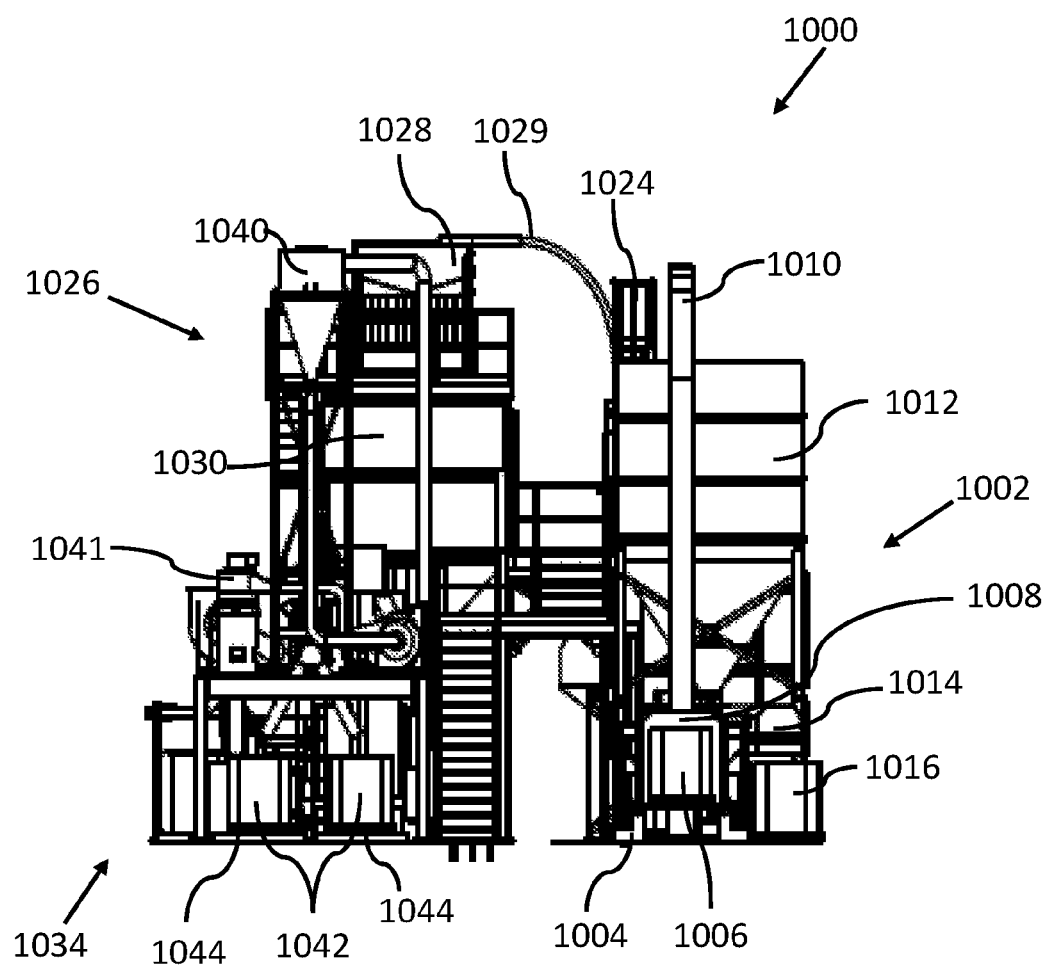
FIG. 4 illustrates another side view of system 1000 for removing a coating material from another material.

FIG. 4 illustrates another side view of system 1000 for removing a coating material from another material. As more clearly illustrated in FIG. 4, transfer pipe 1029 may effect the transfer of the decoated slurry from decoating mill 1018 to dewater screen 1028.

Figure 5:
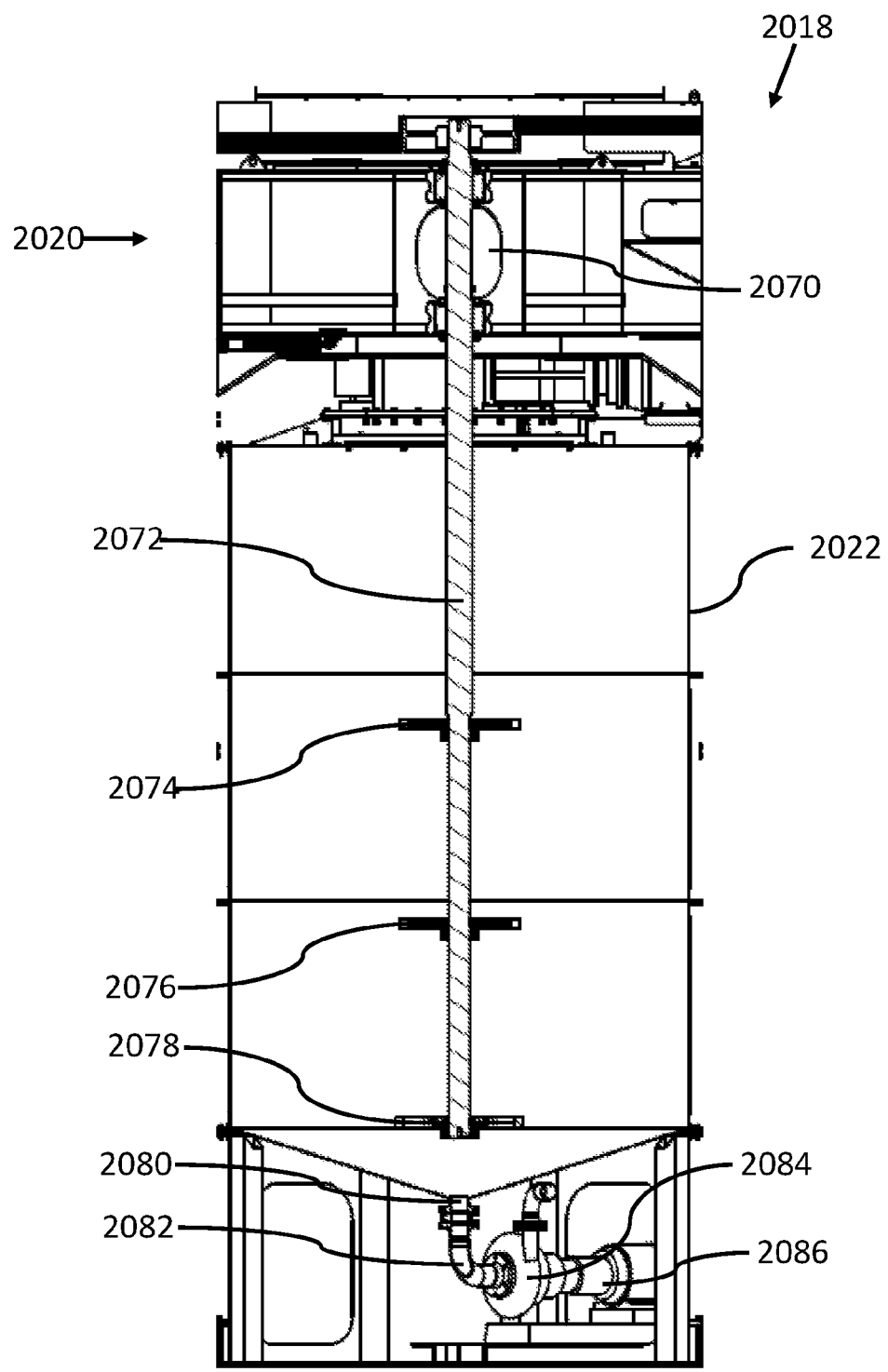
FIG. 5 illustrates a sectional view of a decoating mill 2018.

FIG. 5 illustrates a sectional view of a decoating mill 2018. Decoating mill 2018 may include a drive system 2020. Decoating mill 2018 may include a decoating mill tank 2022.

Decoating mill tank 2022 may include any of a variety of shapes. Decoating mill tank 2022 may be, for example, substantially cylindrical. Decoating mill tank 2022 may have any of a variety of widths, diameters, or heights. Decoating mill tank 2022 may have a height of about 365.8 cm (144.0 in.). Decoating mill tank 2022 may have a height less than about 365.8 cm (144.0 in.) or greater than about 365.8 cm (144.0 in.).

Drive system 2020 may include at least one motor 2070. At least one motor 2070 may be capable of delivering any of various powers. At least one motor 2070 may be capable of delivering about 300 hp. At least one motor 2070 may be capable of delivering less than about 300 hp. At least one motor 2070 may be capable of delivering more than about 300 hp. At least one motor 2070 may be capable of delivering about 300 hp at about 1,765 RPM.

At least one motor 2070 may be operatively connected to at least one variable frequency drive. At least one motor 2070 may include any of a variety of output elements such as a shaft connected to a pulley. At least one motor 2070 may include an output pulley having a diameter of about 33.5 cm (13.2 in.).

At least one motor 2070 may be operatively connected to a drive input element, such as a pulley connected to a shaft. At least one drive input element may include an input pulley having a diameter of about 71.1 cm (28.0 in.). The input pulley may be mechanically coupled to the output pulley referenced above. The input pulley may be mechanically connected to the output pulley through any of a variety of coupling elements, including for example a belt or a chain. The output pulley and input pulley may have a ratio of about 2.12:1. In one embodiment, the output pulley and the input pulley may be replaced with an output gear and an input gear, respectively.

At least one motor 2070 may operate within any of a variety of RPM ranges. At least one motor 2070 may operate within a range of about 1,236 RPM to about 1,450 RPM. At least one motor 2070 may operate at a speed less than about 1,236 and/or greater than about 1,450. At least one motor 2070 may operate between about 800 RPM and about 1,800 RPM. At least one motor 2070 may operate less than about 800 RPM or greater than about 1,800 RPM. At least one motor 2070 may operate between about 800 RPM and about 1,236 RPM. At least one motor 2070 may operate between about 800 RPM and about 1,450 RPM. At least one motor 2070 may operate between about 1,236 RPM and about 1,800 RPM. At least one motor 2070 may operate between about 1,450 RPM and about 1,800 RPM.

At least one motor 2070 may be operatively connected to at least one shaft 2072. At least one shaft 2072 may be connected to an input pulley, which in turn is mechanically coupled to an output pulley, which may be connected to at least one motor 2070. At least one shaft 2072 may be an elongated shaft. At least one shaft 2072 may be configured to operate within a range of about 583 RPM and about 684 RPM. At least one shaft 2072 may operate at a speed less than about 583 RPM and/or greater than about 684 RPM. At least one shaft 2072 may operate at a speed of between about 800 RPM and 1,800 RPM. At least one shaft 2072 may operate at a speed of less than about 800 RPM and/or greater than about 1,800 RPM. At least one shaft 2072 may operate at a speed of between about 583 RPM and about 1,800 RPM. At least one shaft 2072 may operate at a speed of between about 583 RPM and about 800 RPM. At least one shaft may operate at a speed of between about 684 RPM and about 800 RPM. At least one shaft may operate at a speed of between about 684 RPM and about 1,800 RPM.

At least one shaft 2072 may extend into decoating mill tank 2022. At least one shaft 2072 may be a metal shaft. At least one shaft 2072 may be a steel shaft. At least one shaft 2072 may be a stainless steel shaft. At least one shaft 2072 may be made of any of a variety of materials. At least one shaft 2072 may have a diameter of about 15.2 cm (6.0 in.). At least one shaft 2072 may have any of a variety of diameters, including diameters less than about 15.2 cm (6.0 in.) and greater than about 15.2 cm (6.0 in.).

At least one shaft 2072 may be connected to at least one actuator configured to move at least one shaft 2072 at least one of longitudinally and transversely. At least one shaft 2072 may be configured to move longitudinally up to about 121.9 cm (48.0 in.). At least one shaft 2072 may be configured move any distance longitudinally, including less than about 121.9 cm (48.0 in.) and greater than about 121.9 cm (48.0 in.). At least one shaft 2072 may be configured to move transversely up to about 45.7 cm (18.0 in.). At least one shaft 2072 may be configured to move any distance transversely, including less than about 45.7 cm (18.0 in.) and greater than about 45.7 cm (18.0 in.).

At least one shaft 2072 may be connected to at least one rotary blade, including for example at least one of rotary blade 2074, 2076, and 2078. At least one shaft 2072 may be connected to any number of rotary blades, including less than three rotary blades and greater than three rotary blades. At least one shaft 2072 may be directly connected to at least one rotary blade, including for example at least one of rotary blade 2074, 2076, and 2078. At least one shaft 2072 may be indirectly connected, through a gear train, pulley system, transmission, or the like, to at least one rotary blade, including for example at least one of rotary blade 2074, 2076, and 2078.

Rotary blade 2074 may include any diameter able to fit within decoating mill tank 2022. Rotary blade 2074 may have a diameter of about 71.1 cm (28.0 in.). Rotary blade 2074 may have a diameter less than about 71.1 cm (28.0 in.) or greater than about 71.1 cm (28.0 in.).

Rotary blade 2074 may operate at any of a variety of RPMs, and may have any of a variety of blade tip speeds. Rotary blade 2074 may have a range of blade tip speeds between about 1,303.1 meter per minute ("mpm") (51,304.0 inch per minute ("ipm")) and about 1,528.9 mpm (60,192.0 ipm). Rotary blade 2074 may have blade tip speeds less than about 1,303.1 mpm (51,304.0 ipm) and greater than about 1,528.9 mpm (60,192.0 ipm). Rotary blade 2074 may have a range of blade tip speeds between about 1,787.4 mpm (70,371.7 ipm) and about 4,021.7 mpm (158,336.3 ipm). Rotary blade 2074 may have a range of blade tip speeds between about 1,303.1 mpm (51,304.0 ipm) and about 4,021.7 mpm (158,336.3 ipm). Rotary blade 2074 may have a range of blade tip speeds between about 1,528.9 mpm (60,192.0 ipm) and about 1,787.4 mpm (70,371.7 ipm). Rotary blade 2074 may have a range of blade tip speeds between about 1,528.9 mpm (60,192.0 ipm) and about 4,021.7 mpm (158,336.3 ipm). Rotary blade 2074 may have a range of blade tip speeds between about 1,303.1 mpm (51,304.0 ipm) and about 1,787.4 mpm (70,371.7 ipm).

Rotary blade 2074 may be mechanically coupled to shaft 2072. Rotary blade 2074 may be configured to move vertically up to about 121.9 cm (48.0 in.). Rotary blade 2074 may be oriented between about 25.4 cm (10.0 in.) and about 147.3 cm (58 in.) from the top of decoating mill tank 2022. Rotary blade 2074 may be configured to move transversely up to about 45.7 cm (18.0 in.).

Rotary blade 2076 may include any diameter able to fit within decoating mill tank 2022. Rotary blade 2076 may have a diameter of about 71.1 cm (28.0 in.). Rotary blade 2076 may have a diameter less than about 71.1 cm (28.0 in.) or greater than about 71.1 cm (28.0 in.).

Rotary blade 2076 may operate at any of a variety of RPMs, and may have any of a variety of blade tip speeds. Rotary blade 2076 may have a range of blade tip speeds between about 1,303.1 mpm (51,304.0 ipm) and about 1,528.9 mpm (60,192.0 ipm). Rotary blade 2076 may have blade tip speeds less than about 1,303.1 mpm (51,304.0 ipm) and greater than about 1,528.9 mpm (60,192.0 ipm). Rotary blade 2076 may have a range of blade tip speeds between about 1,787.4 mpm (70,371.7 ipm) and about 4,021.7 mpm (158,336.3 ipm). Rotary blade 2076 may have a range of blade tip speeds between about 1,303.1 mpm (51,304.0 ipm) and about 4,021.7 mpm (158,336.3 ipm). Rotary blade 2076 may have a range of blade tip speeds between about 1,528.9 mpm (60,192.0 ipm) and about 1,787.4 mpm (70,371.7 ipm). Rotary blade 2076 may have a range of blade tip speeds between about 1,528.9 mpm (60,192.0 ipm) and about 4,021.7 mpm (158,336.3 ipm). Rotary blade 2076 may have a range of blade tip speeds between about 1,303.1 mpm (51,304.0 ipm) and about 1,787.4 mpm (70,371.7 ipm).

Rotary blade 2076 may be mechanically coupled to shaft 2072. Rotary blade 2076 may be configured to move vertically up to about 121.9 cm (48.0 in.). Rotary blade 2076 may be oriented about 106.7 cm (42.0 in.) below rotary blade 2074 on shaft 2072. Rotary blade 2076 may be oriented less than about 106.7 cm (42.0 in.) or greater than about 106.7 cm (42.0 in.) below rotary blade 2074 on shaft 2072. Rotary blade 2076 may be oriented between about 132.08 cm (52.0 in.) and about 254.0 cm (100.0 in.) from the top of decoating mill tank 2022. Rotary blade 2076 may be configured to move transversely up to about 45.7 cm (18.0 in.).

Rotary blade 2078 may include any diameter able to fit within decoating mill tank 2022. Rotary blade 2078 may have a diameter of about 76.2 cm (30.0 in.). Rotary blade 2078 may have a diameter less than about 76.2 cm (30.0 in.) or greater than about 76.2 cm (30.0 in.). Rotary blade 2078 may be oriented below one or both of rotary blade 2074 and rotary blade 2076. Rotary blade 2078 may have a greater diameter than one or both of rotary blade 2074 and rotary blade 2076. Rotary blade 2078 may be larger than, and positioned relative to, rotary blade 2074 and rotary blade 2076 to facilitate increased movement of material within decoating mill 2018.

Rotary blade 2078 may operate at any of a variety of RPMs, and may have any of a variety of blade tip speeds. Rotary blade 2078 may have a range of blade tip speeds between about 1,406.8 mpm (55,385.0 ipm) and about 1,650.5 mpm (64,980.0 ipm). Rotary blade 2078 may have blade tip speeds less than about 1,406.8 mpm (55,385.0 ipm) and greater than about 1,650.5 mpm (64,980.0 ipm). Rotary blade 2078 may have a range of blade tip speeds between about 1,915.1 mpm (75,398.2 ipm) and about 4,309.0 mpm (169,646.0 ipm). Rotary blade 2078 may have a range of blade tip speeds between about 1,395.6 mpm (54,947.0 ipm) and about 4,309.0 mpm (169,646.0 ipm). Rotary blade 2078 may have a range of blade tip speeds between about 1,637.4 mpm (64,466.0 ipm) and about 1,915.1 mpm (75,398.2 ipm). Rotary blade 2078 may have a range of blade tip speeds between about 1,637.4 mpm (64,466.0 ipm) and about 4,309.0 mpm (169,646.0 ipm). Rotary blade 2078 may have a range of blade tip speeds between about 1,395.6 mpm (54,947.0 ipm) and about 1,915.1 mpm (75,398.2 ipm).

Rotary blade 2078 may be mechanically coupled to shaft 2072. Rotary blade 2078 may be configured to move vertically up to about 121.9 cm (48.0 in.). Rotary blade 2078 may be oriented about 106.7 cm (42.0 in.) below rotary blade 2076 on shaft 2072. Rotary blade 2078 may be oriented less than about 106.7 cm (42.0 in.) or greater than about 106.7 cm (42.0 in.) below rotary blade 2076 on shaft 2072. Rotary blade 2078 may be oriented between about 238.8 cm (94.0 in.) and about 360.7 cm (142.0 in.) from the top of decoating mill tank 2022. Rotary blade 2078 may be oriented between about 160.0 cm (63.0 in.) and about 38.1 cm (15.0 in.) from the bottom of decoating mill tank 2022. Rotary blade 2078 may be configured to move transversely up to about 45.7 cm (18.0 in.).

Decoating mill tank 2022 may include an outlet 2080. Outlet 2080 may be oriented at or near the bottom of decoating mill tank 2022. Outlet 2080 may have any of a variety of diameters as may be necessary to achieve desired material flow rate, material size, size of decoating mill tank 2022, and the like. Outlet 2080 may have a diameter of about 10.2 cm (4.0 in.). Outlet 2080 may have a diameter of less than about 10.2 cm (4.0 in.) or greater than about 10.2 cm (4.0 in.).

A pump inlet line 2082 may connect outlet 2080 to a pump 2084. Pump inlet line 2082 may be any of a variety of diameters, including for example about 10.2 cm (4.0 in.). Pump 2084 may be configured to pump decoated slurry from within decoating mill tank 2022. Pump 2084 may be configured to pump decoated slurry from within decoating mill tank 2022 to a screening station (such as screening station 1026 illustrated in FIG. 1) and/or a dewater screen (such as dewater screen 1028 illustrated in FIG. 1).

Pump 2084 may be any of a variety of pumps capable of pumping a decoated slurry. Pump 2084 may be an impeller pump. Pump 2084 may include an inlet having any of a variety of diameters, including for example about 10.2 cm (4.0 in.). Pump 2084 may include an outlet having any of a variety of diameters, including for example about 7.6 cm (3.0 in.).

A pump outlet line 2086 may be connected to an outlet of pump 2084. Pump outlet line 2086 may be configured to transport decoated slurry from pump 2084 to a screening station (such as screening station 1026 illustrated in FIG. 1) and/or a dewater screen (such as dewater screen 1028 illustrated in FIG. 1). Pump outlet line 2086 may be made of any of a variety of materials, including for example a steel, a stainless steel, and the like. Pump outlet line 2086 may have any of a variety of diameters, including for example about 7.6 cm (3.0 in.).

Pump outlet line 2086 may include any of a variety of elbows, bends, and the like to direct decoated slurry from decoating mill 2018. Pump outlet line 2086 may include long radius elbows. Pump outlet line 2086 may include elbows having a radius of at least about 76.2 cm (30.0 in.). Pump outlet line 2086 may include elbows having a radius large enough to permit desired flow rate of decoated slurry from decoating mill 2018.

Figure 6B:
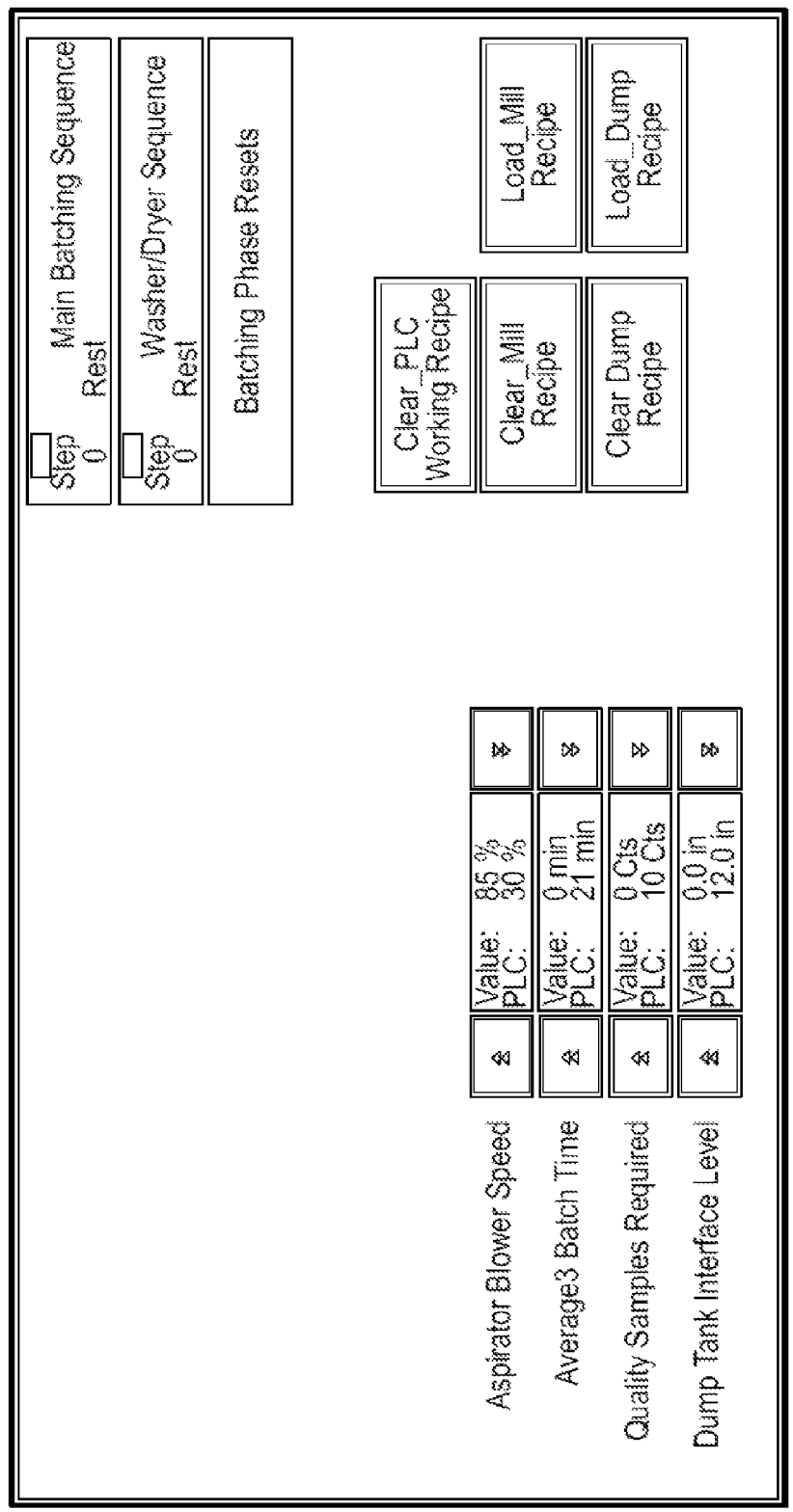
FIG. 6B illustrates a partial view of a control screen view used in a system for removing a coating material from another material.

FIGS. 6A and 6B illustrate partial views of a control screen view used in system 1000 for removing a coating material from another material. FIGS. 6A and 6B illustrate a recipe editor view for a user interface of system 1000. The recipe editor allows one to control various inputs in system 1000, including for example: amount of caustic to add to decoating mill tank 1022, amount of various chemicals to add to decoating mill tank 1022 (some of which are illustrated as Chemicals A-F), rotary blade shaft horizontal and vertical positions, amounts of water to be added to decoating mill tank 1022, amount of coated material to be added to decoating mill tank 1022, feed conveyor speed to add coated material to decoating mill tank 1022, aspirator 1040 blower speed, average processing time, and the like. Once a user inputs the various values to be used, the inputs can be saved as a recipe so a user does not have to manually enter these various values again.

FIGS. 7A and 7B illustrate partial views of a control screen view used in system 1000 for removing a coating material from another material. FIGS. 7A and 7B illustrate the various system parameters during operation of system 1000. For example, a user can input values such as: water temperatures, rotary blade positions, flow rates of various liquids, liquid fill levels, chemical levels, shaft speeds, and the like. The individual parameters may be adjusted in through user interface.

Figure 8A:
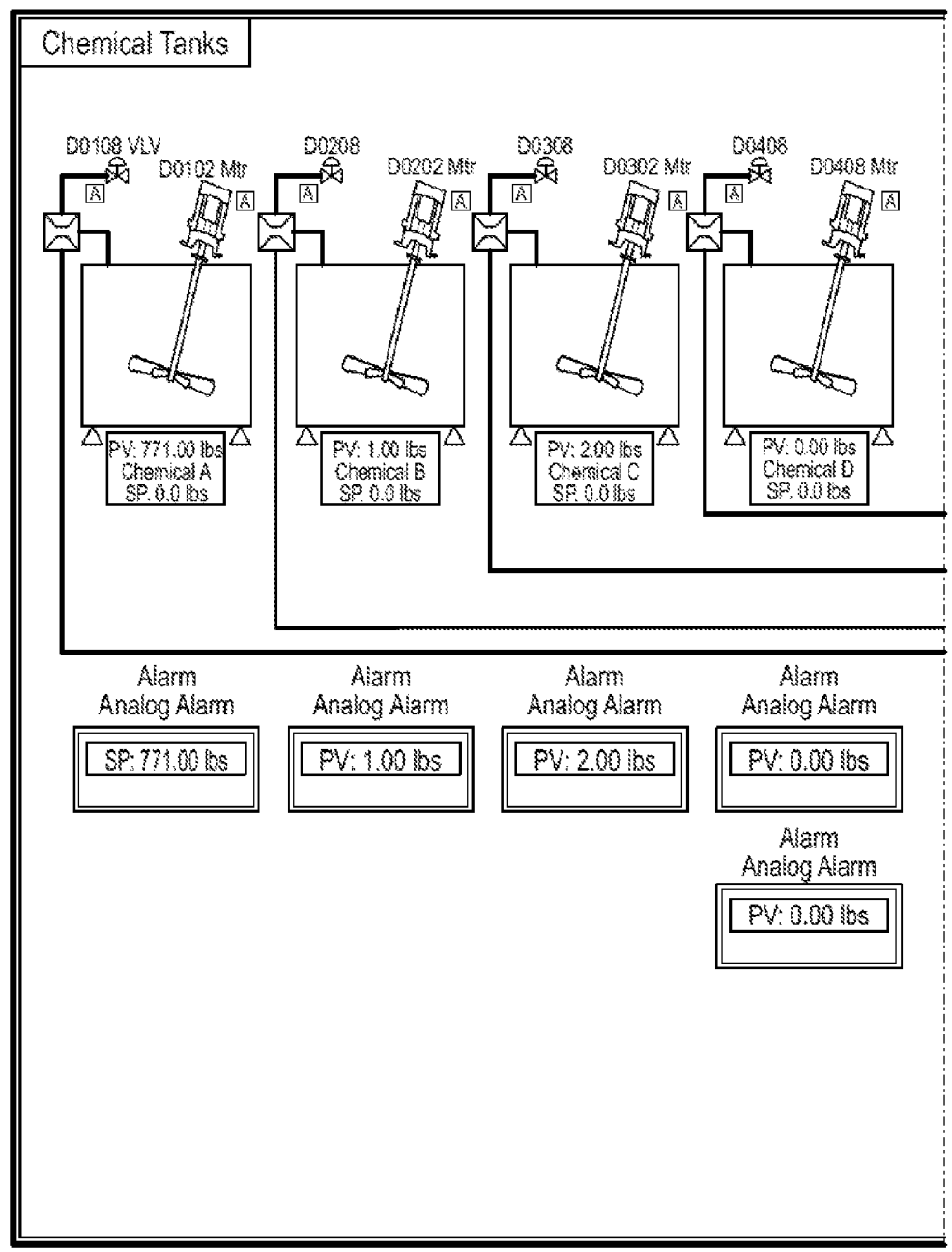
FIG. 8A illustrates a partial view of a control screen view used in a system for removing a coating material from another material.
Figure 8B:
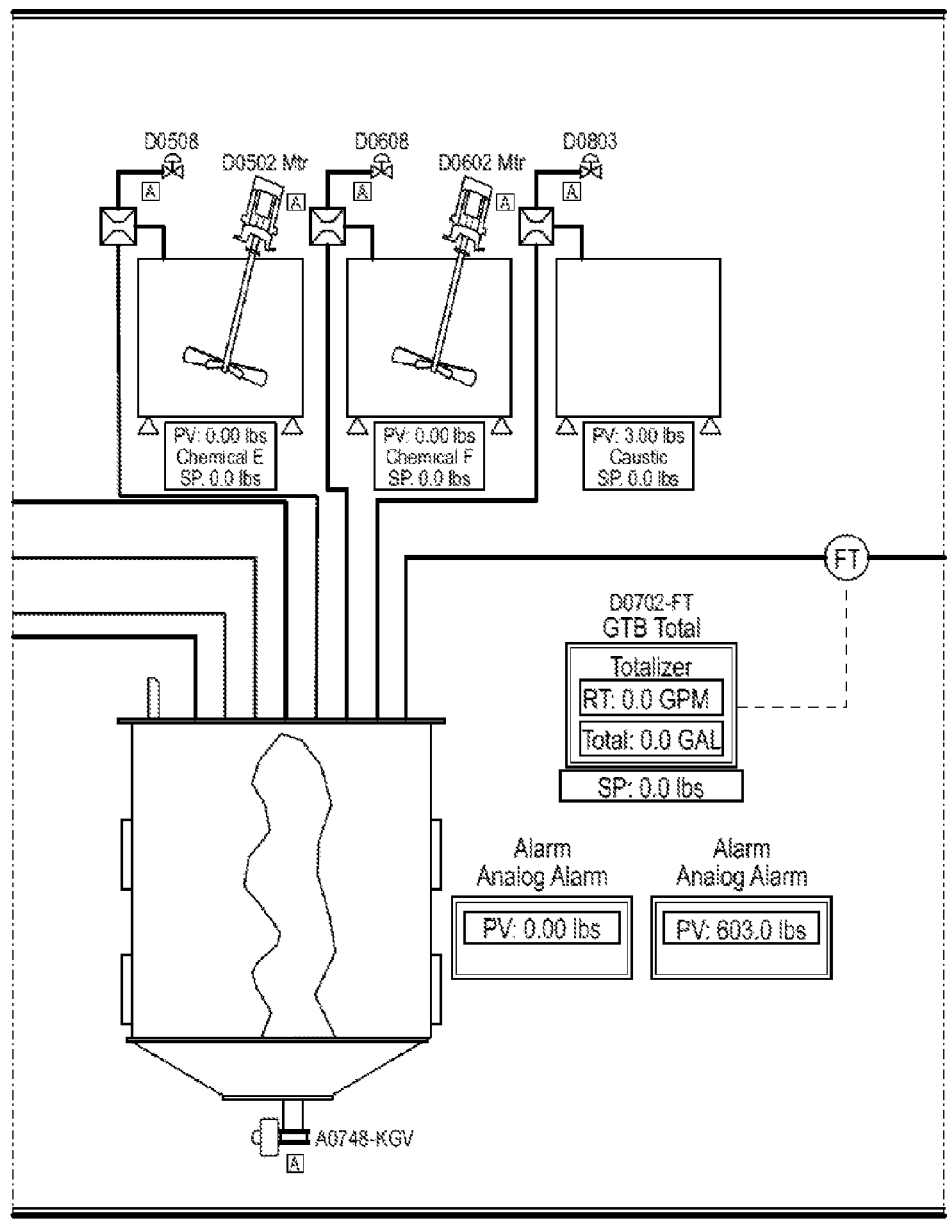
FIG. 8B illustrates a partial view of a control screen view used in a system for removing a coating material from another material.
Figure 8C:
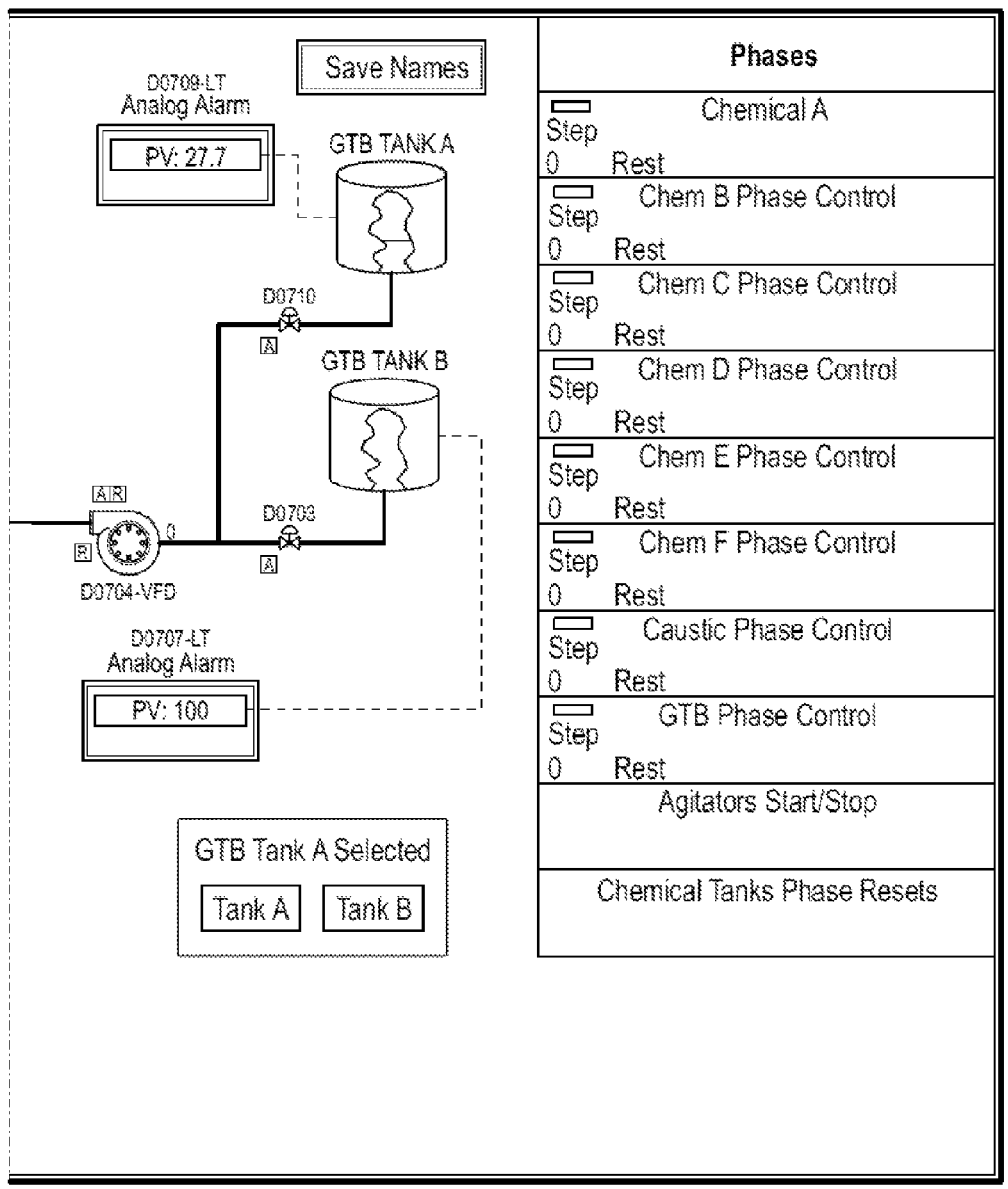
FIG. 8C illustrates a partial view of a control screen view used in a system for removing a coating material from another material.

FIGS. 8A, 8B, and 8C illustrate partial views of a control screen view used in system 1000 for removing a coating material from another material. FIGS. 8A, 8B, and 8C illustrate the system view allowing a user to monitor various properties of process chemical feed system 1062. The various properties include, for example, chemical levels in decoating mill tank 1022.

Figure 9A:
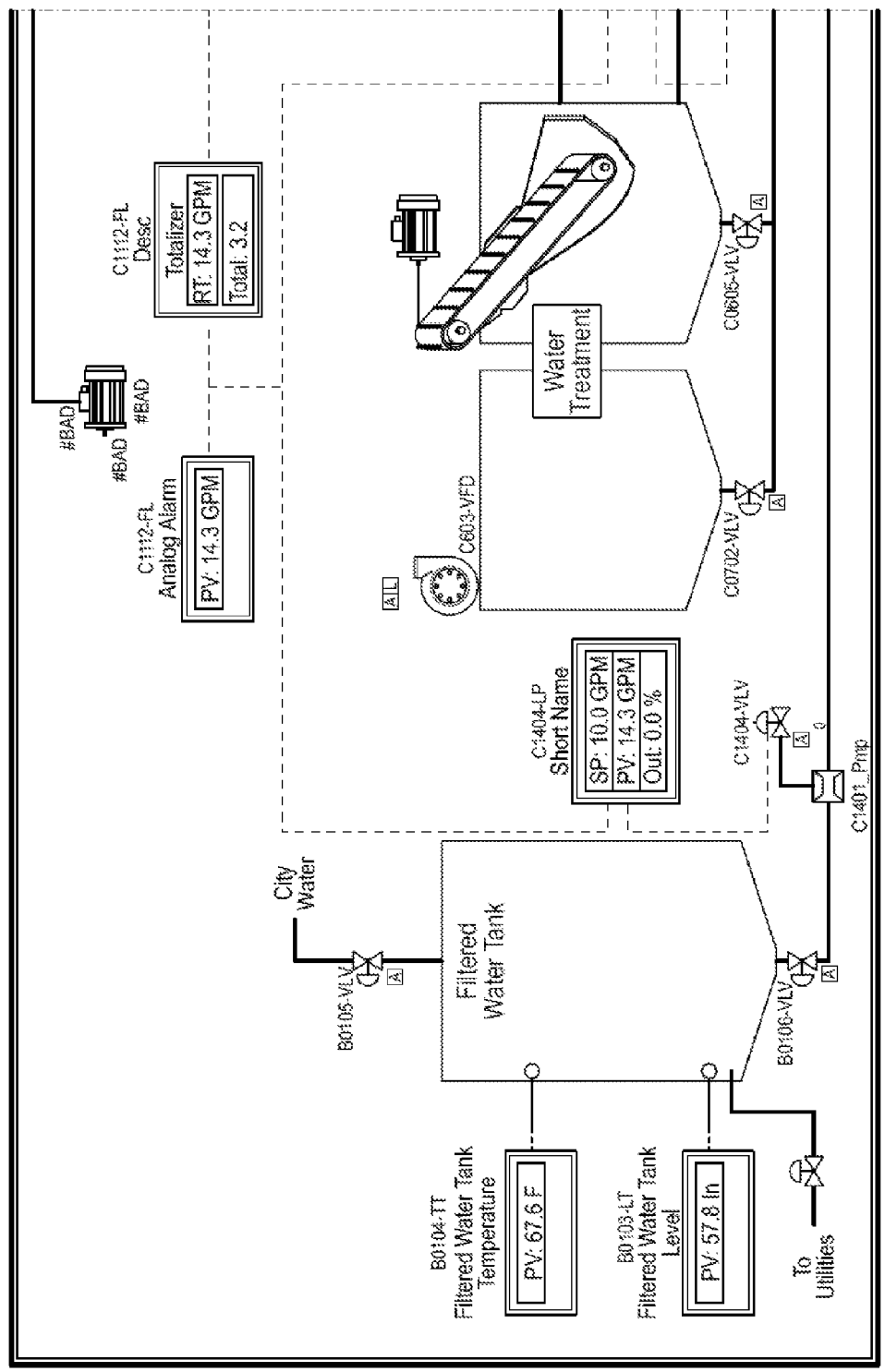
FIG. 9A illustrates a partial view of a control screen view used in a system for removing a coating material from another material.
Figure 9B:
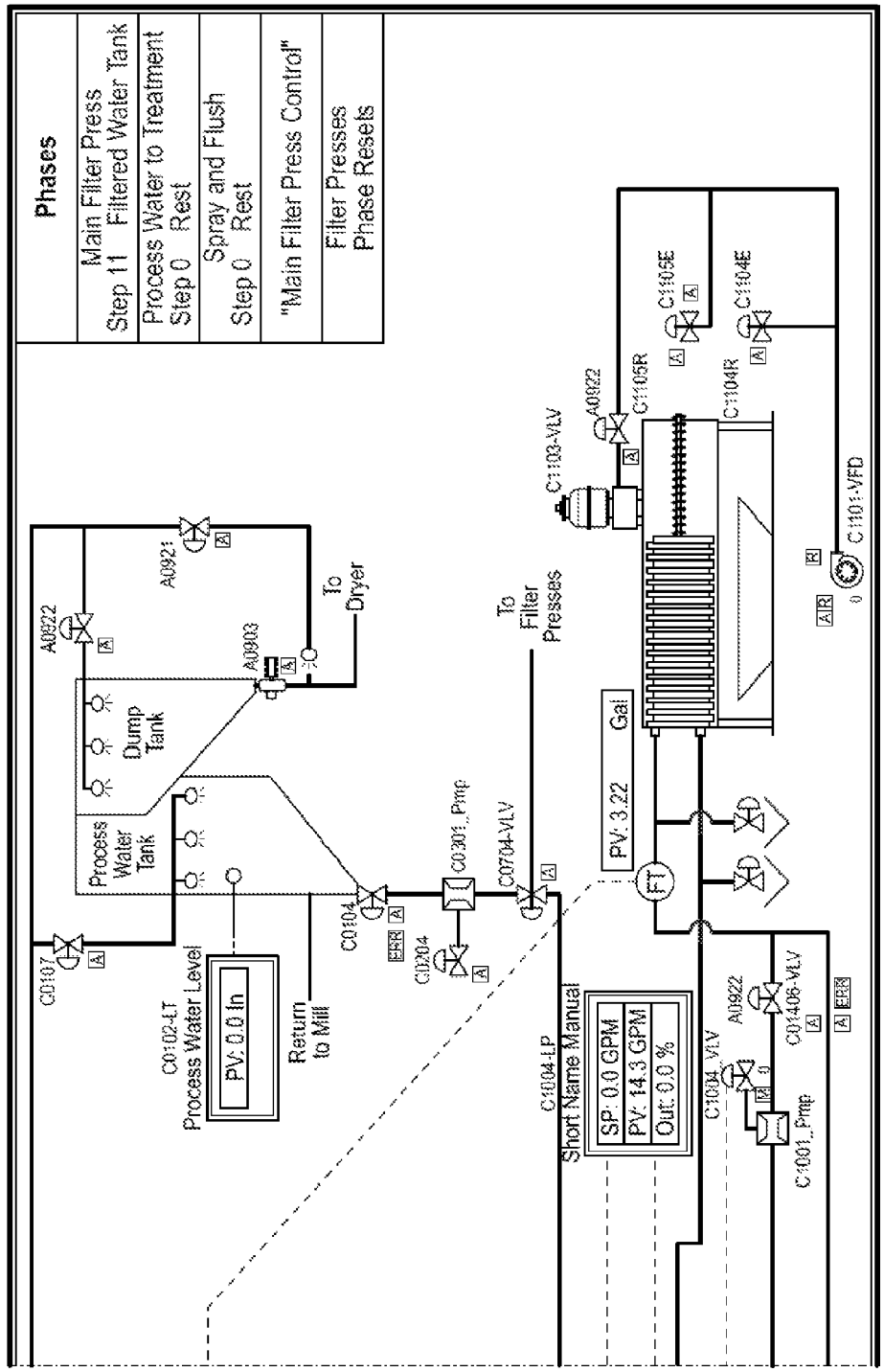
FIG. 9B illustrates a partial view of a control screen view used in a system for removing a coating material from another material.

FIGS. 9A and 9B illustrate partial views of a control screen view used in system 1000 for removing a coating material from another material. FIGS. 9A and 9B illustrate the system view allowing a user to monitor various properties of waste water treatment station 1046 and screen station 1026. Properties include water temperatures, valve positions, phases, filter press positions, status of various process steps of waste water treatment station 1046 and screen station 1026, and the like.

Figure 10A:
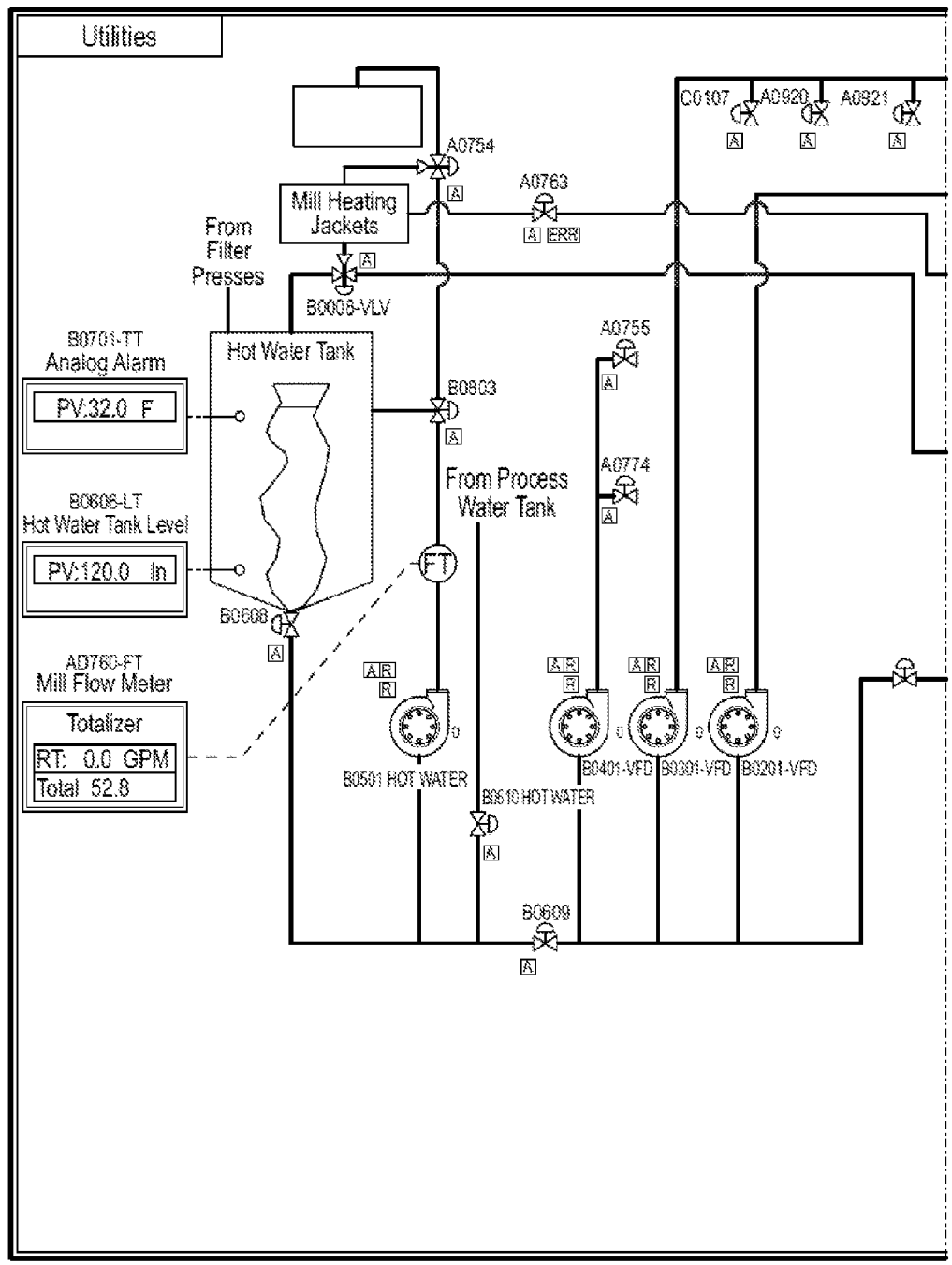
FIG. 10A illustrates a partial view of a control screen view used in a system for removing a coating material from another material.
Figure 10B:
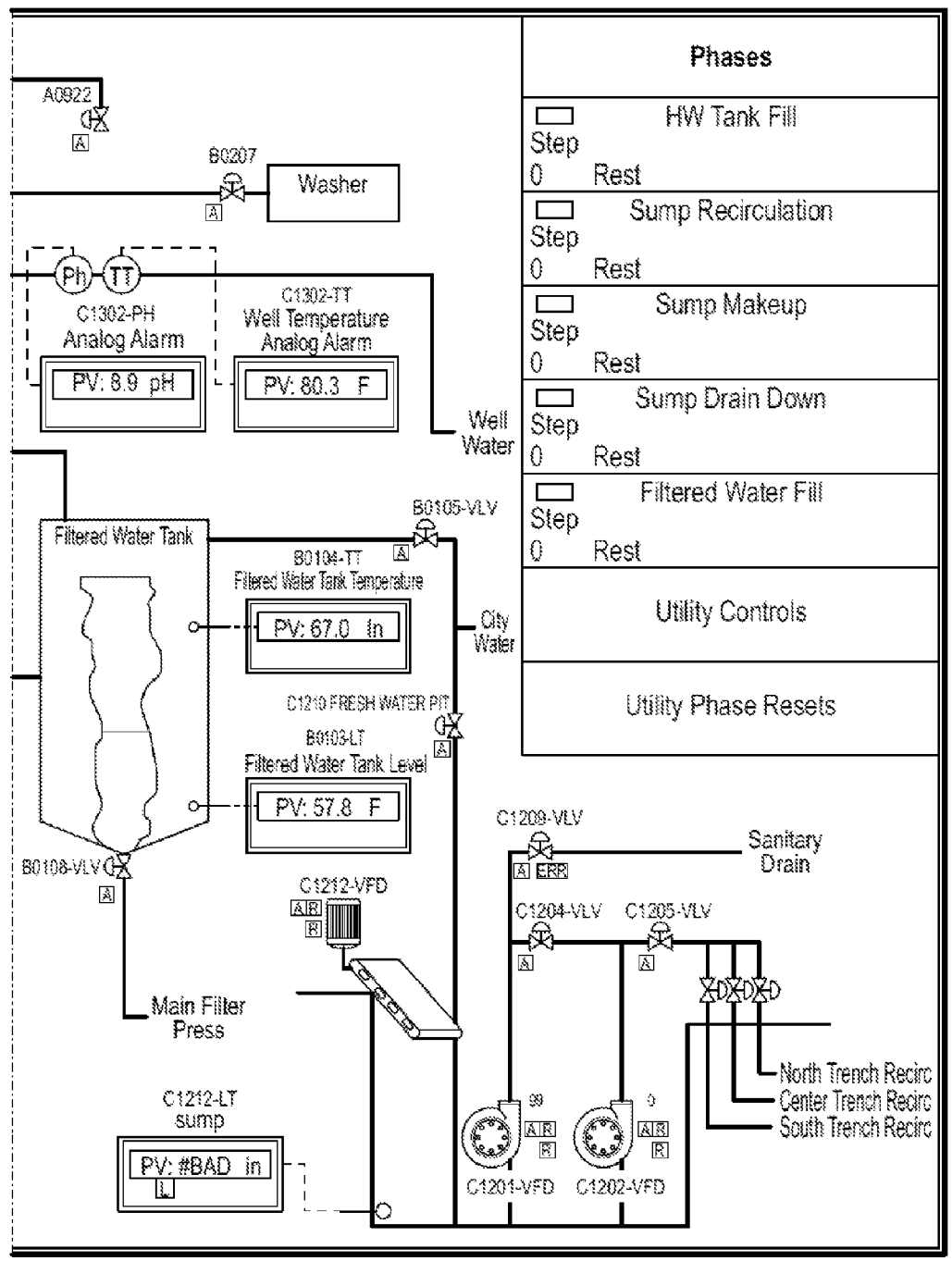
FIG. 10B illustrates a partial view of a control screen view used in a system for removing a coating material from another material.

FIGS. 10A and 10B illustrate partial views of a control screen view used in system 1000 for removing a coating material from another material. FIGS. 10A and 10B illustrate the system view allowing a user to monitor various properties of staging water tank 1058 and heating tank 1060. Properties include water temperatures, water levels, pump status, valve positions, and the like.

Figure 11A:
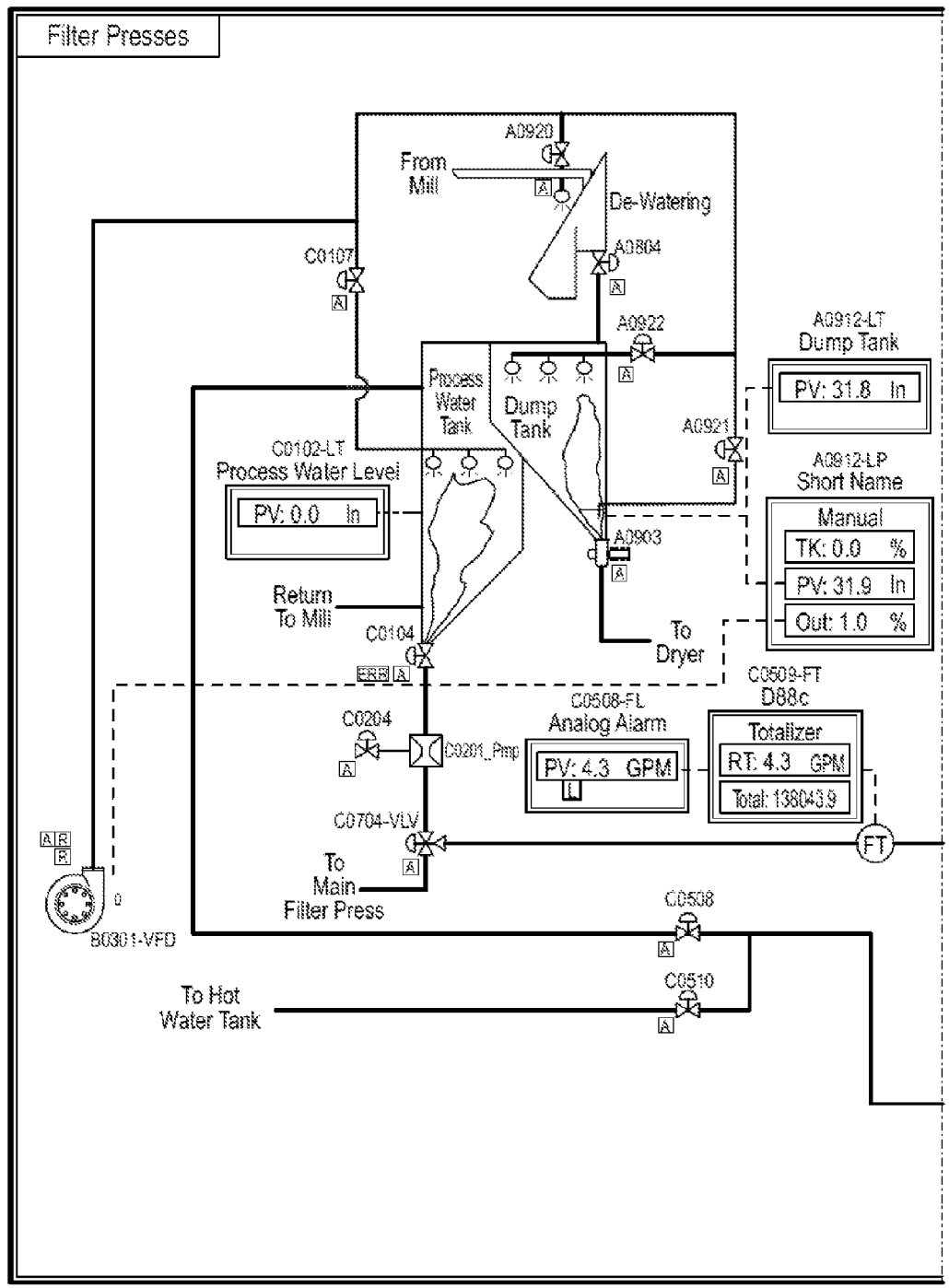
FIG. 11A illustrates a partial view of a control screen view used in a system for removing a coating material from another material.
Figure 11B:
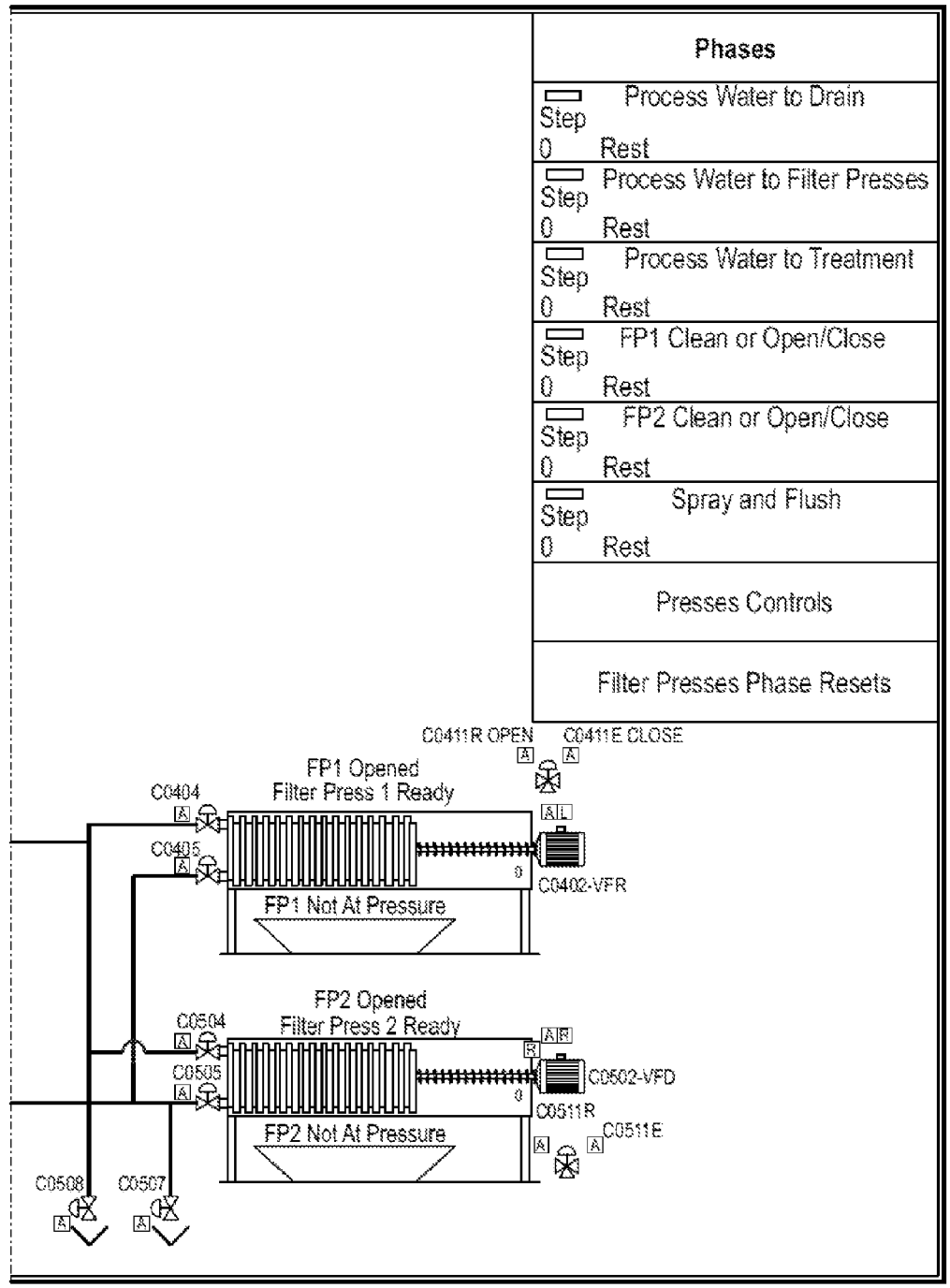
FIG. 11B illustrates a partial view of a control screen view used in a system for removing a coating material from another material.

FIGS. 11A and 11B illustrate partial views of a control screen view used in system 1000 for removing a coating material from another material. FIGS. 11A and 11B illustrate the system view allowing a user to monitor various properties of at least one process water filter press 1052, dump hopper 1030, and recovery tank 1032. Properties include water levels, valve positions, filter press positions, and the like.

Figure 12A:
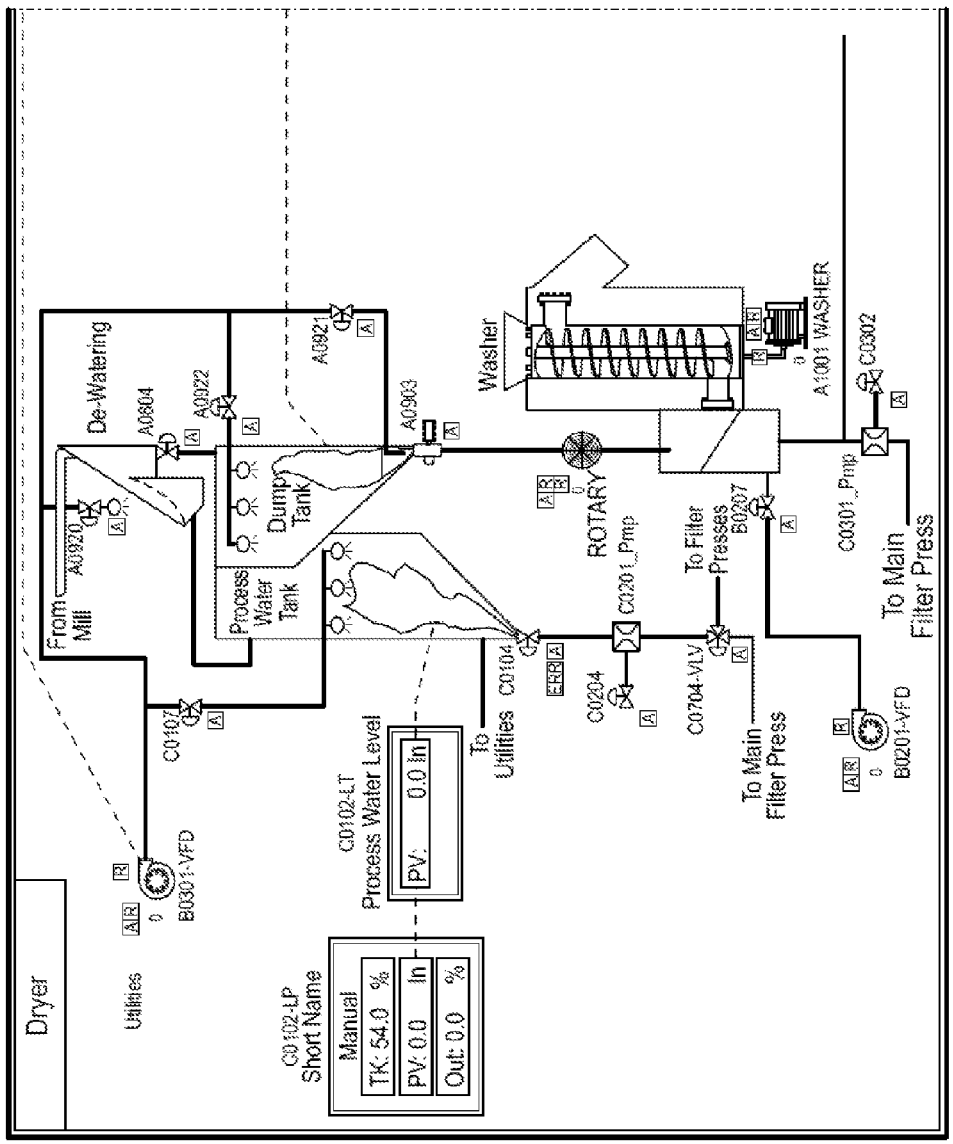
FIG. 12A illustrates a partial view of a control screen view used in a system for removing a coating material from another material.
Figure 12B:
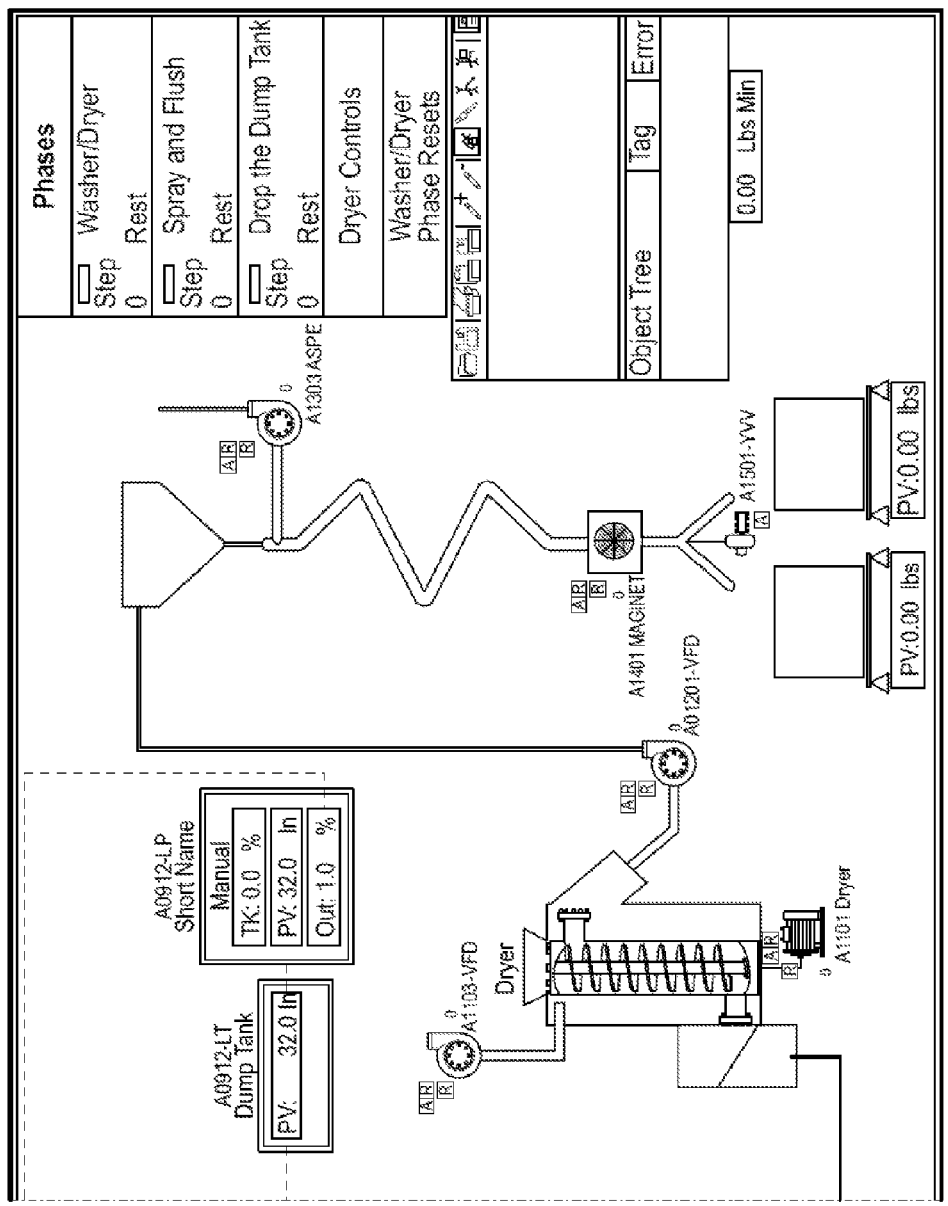
FIG. 12B illustrates a partial view of a control screen view used in a system for removing a coating material from another material.

FIGS. 12A and 12B illustrate partial views of a control screen view used in system 1000 for removing a coating material from another material. FIGS. 12A and 12B illustrate the system view allowing a user to monitor various properties of dump hopper 1030, and recovery tank 1032, washer 1036, dryer 1038, aspirator 1040, and collection containers 1042. Properties include water levels, valve positions, status of washing, status of drying, status of aspirating, weight of collection containers 1042, and the like.

Figure 13A:
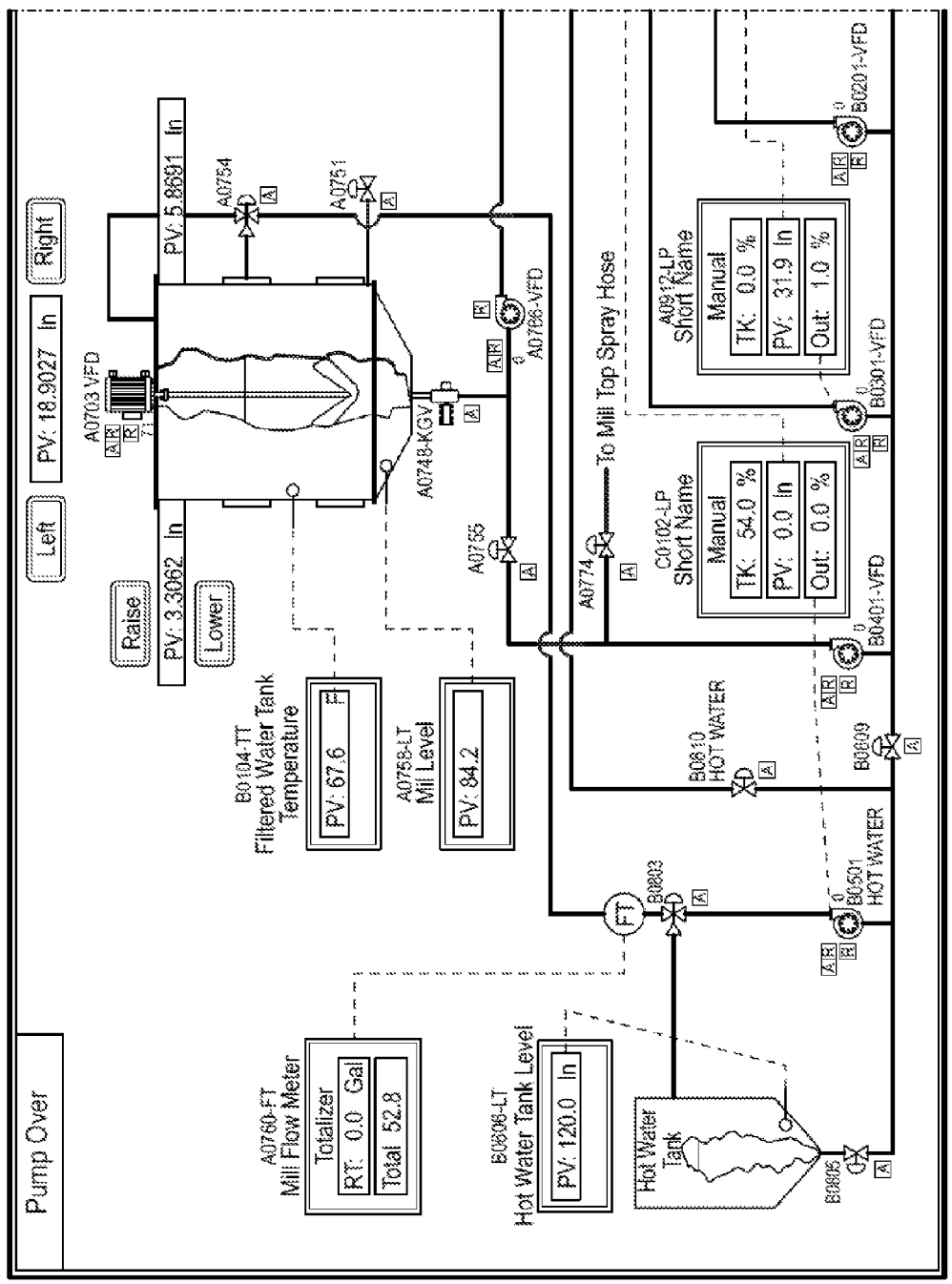
FIG. 13A illustrates a partial view of a control screen view used in a system for removing a coating material from another material.
Figure 13B:
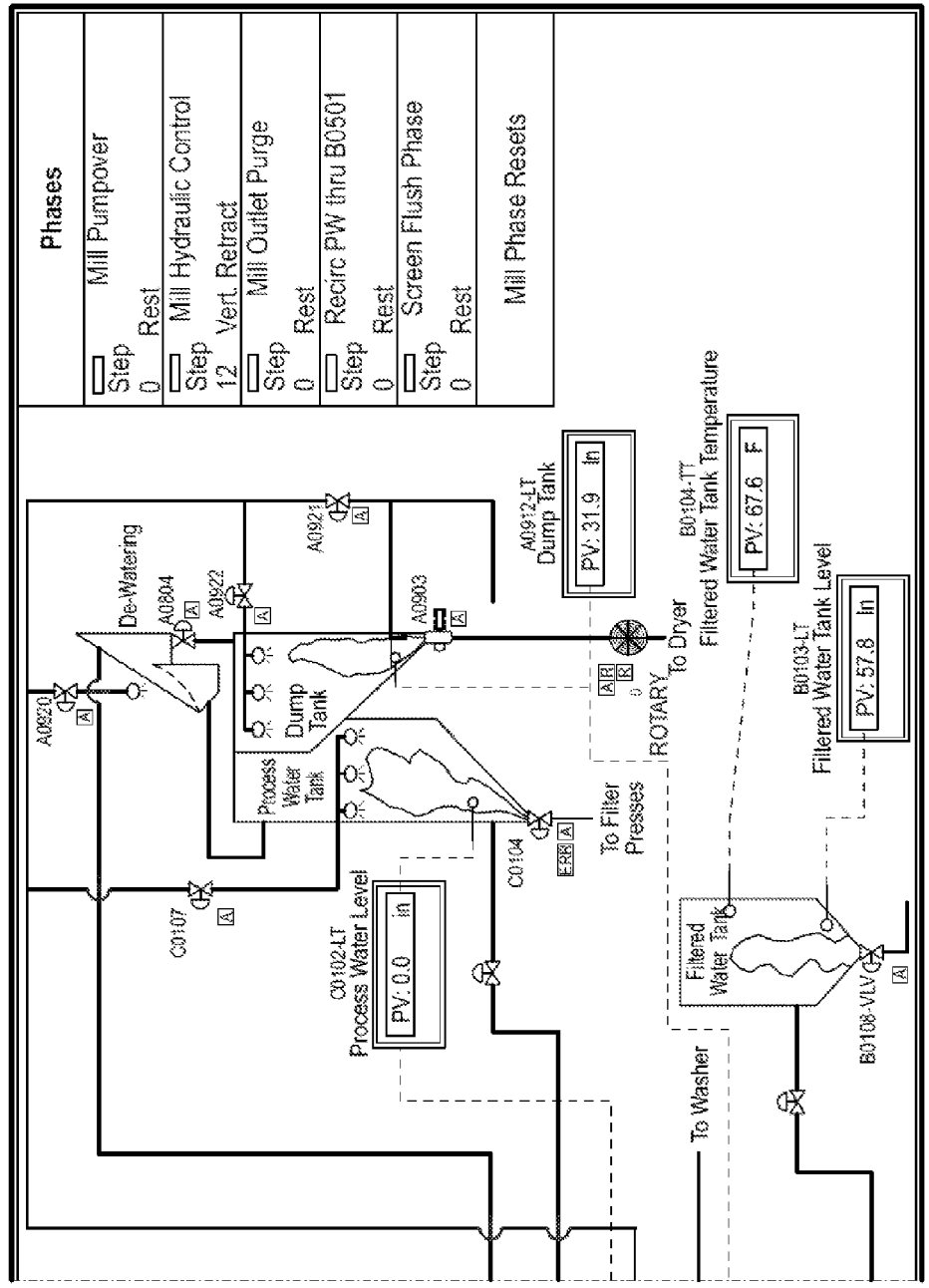
FIG. 13B illustrates a partial view of a control screen view used in a system for removing a coating material from another material.

FIGS. 13A and 13B illustrate partial views of a control screen view used in system 1000 for removing a coating material from another material. FIGS. 13A and 13B illustrate the system view allowing a user to monitor various properties of decoating mill 1018, dump hopper 1030, recovery tank 1032, staging water tank 1058, and heating tank 1060, particularly during a pump over operation. Properties include fluid levels, fluid temperatures, valve positions, pump status, shaft vertical positions, shaft horizontal positions, and the like.

Figure 14A:
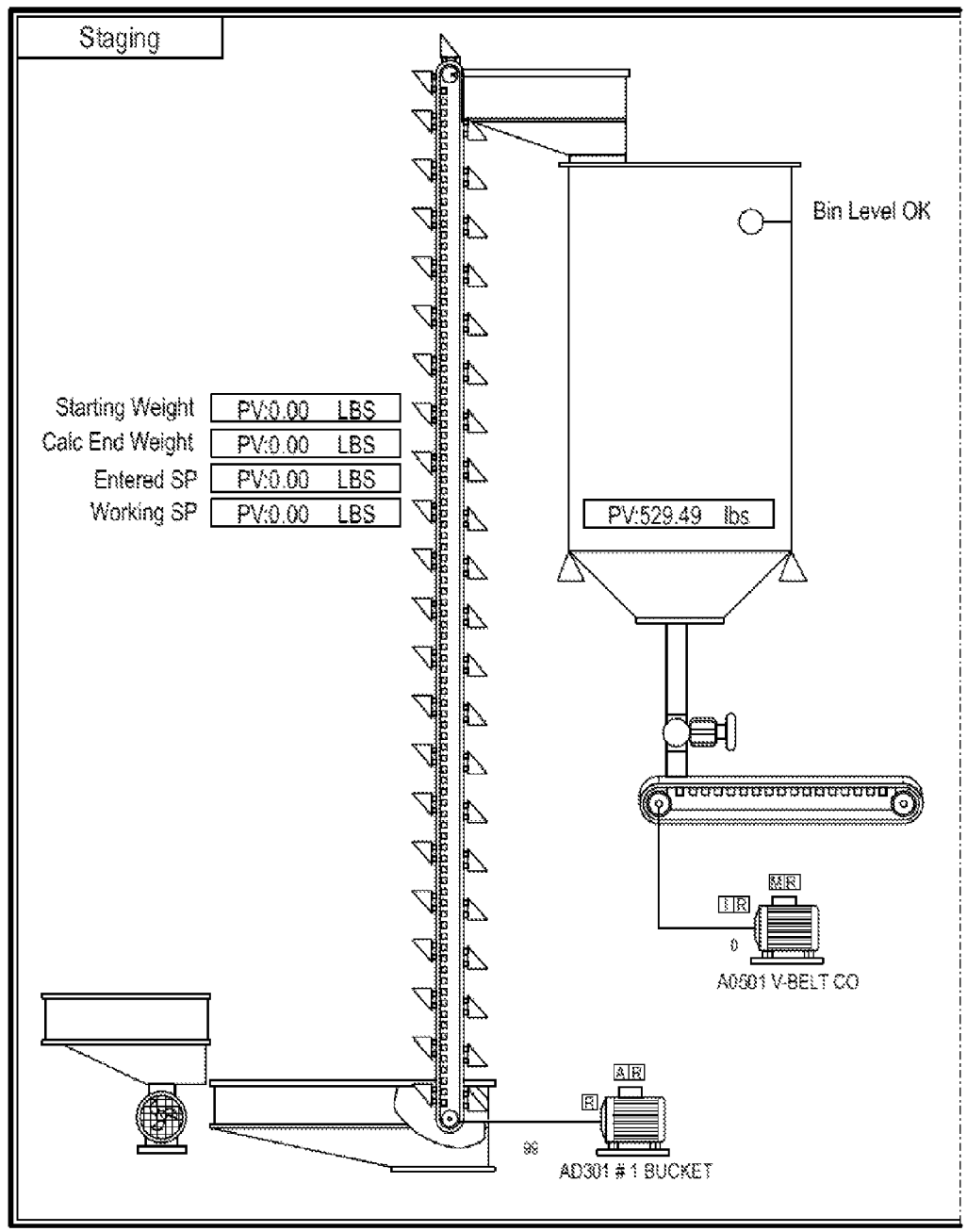
FIG. 14A illustrates a partial view of a control screen view used in a system for removing a coating material from another material.
Figure 14B:
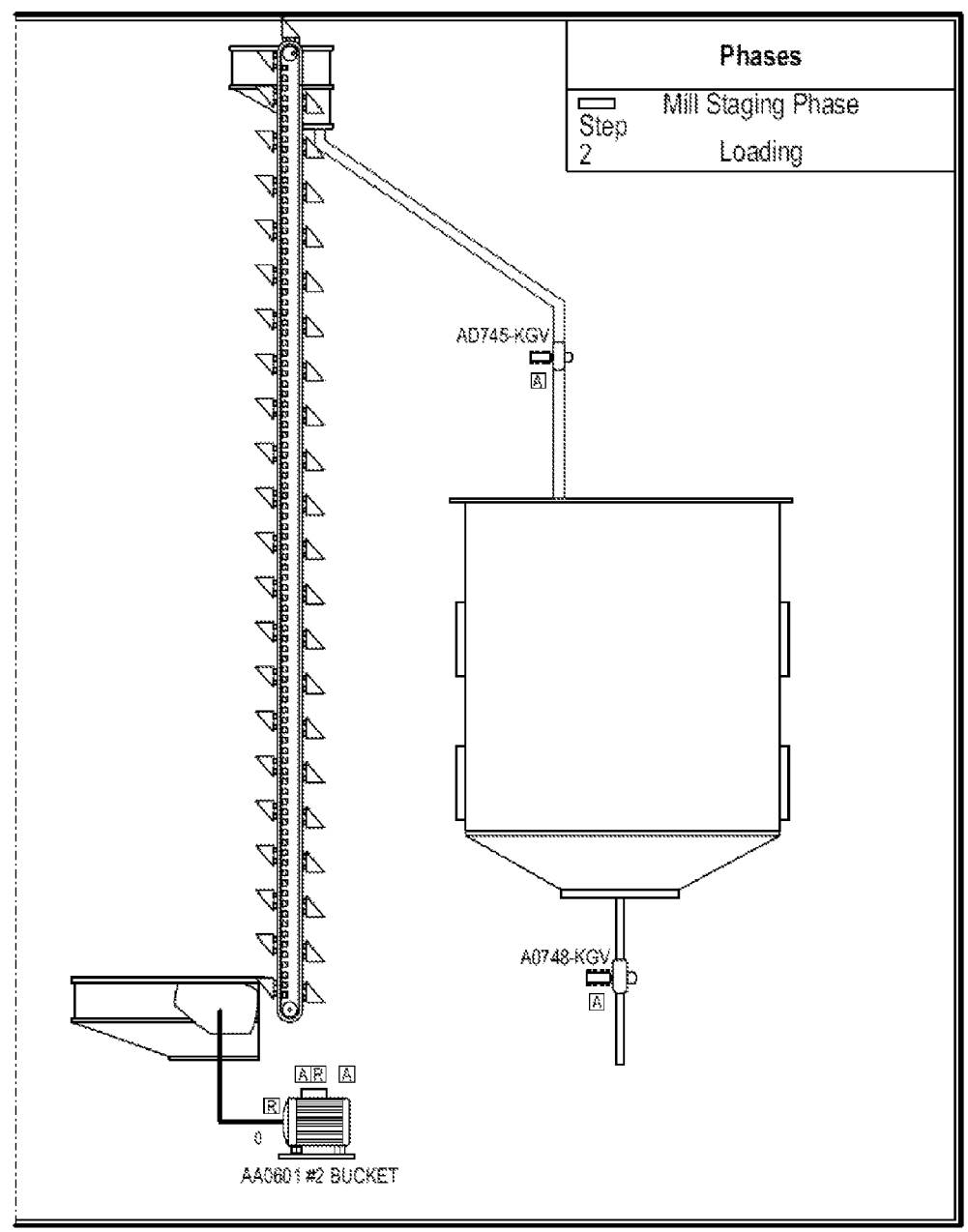
FIG. 14B illustrates a partial view of a control screen view used in a system for removing a coating material from another material.

FIGS. 14A and 14B illustrate partial views of a control screen view used in system 1000 for removing a coating material from another material. FIGS. 14A and 14B illustrate the system view allowing a user to monitor various properties of loading station 1002 including staging hopper 1012 and first elevator 1010, decoating mill 1018, and second elevator 1024. Properties include loading station 1002 status, staging hopper 1012 capacity, first elevator 1010 status, second elevator 1024 status, and the like.

Figure 15A:
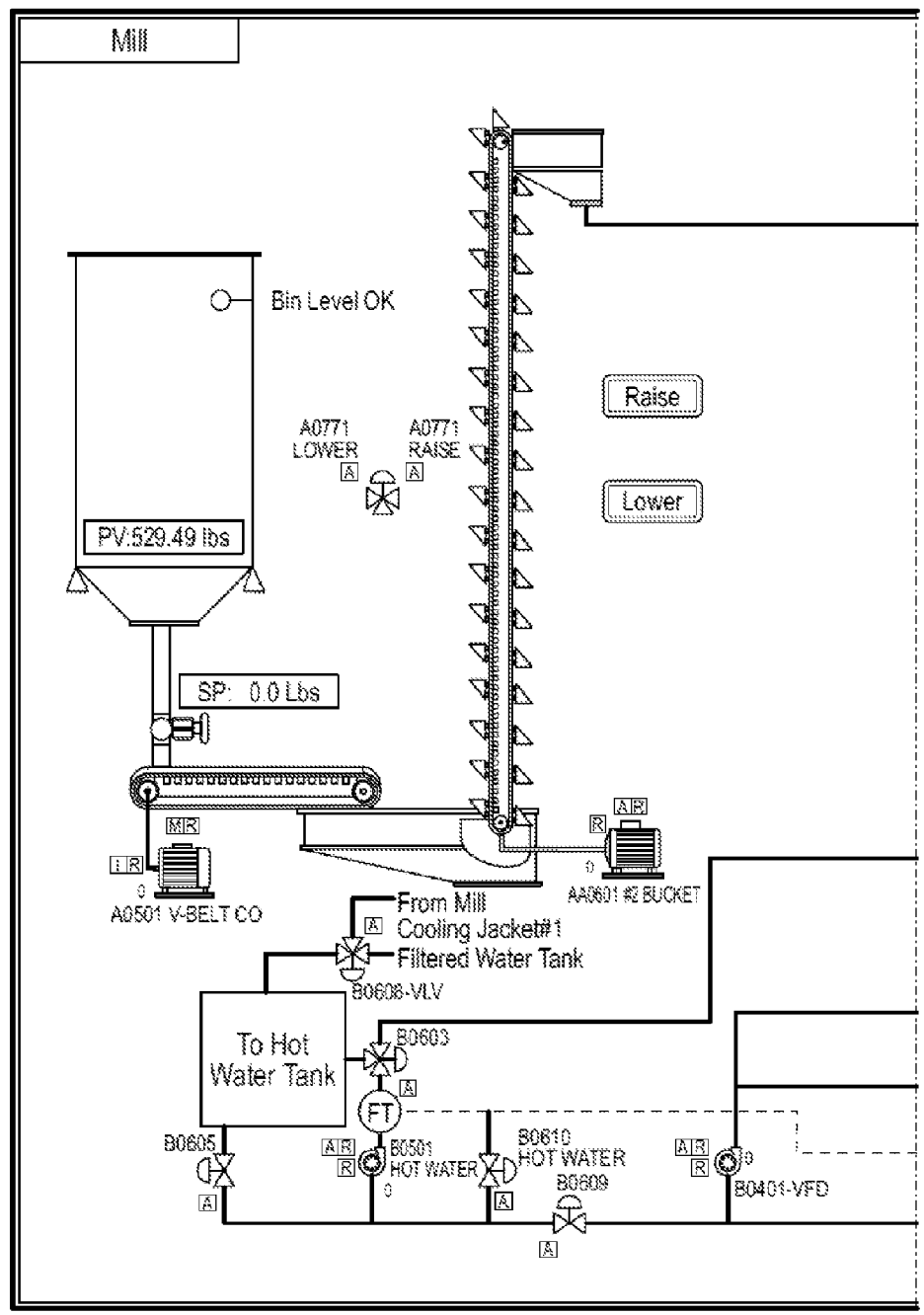
FIG. 15A illustrates a partial view of a control screen view used in a system for removing a coating material from another material.
Figure 15B:
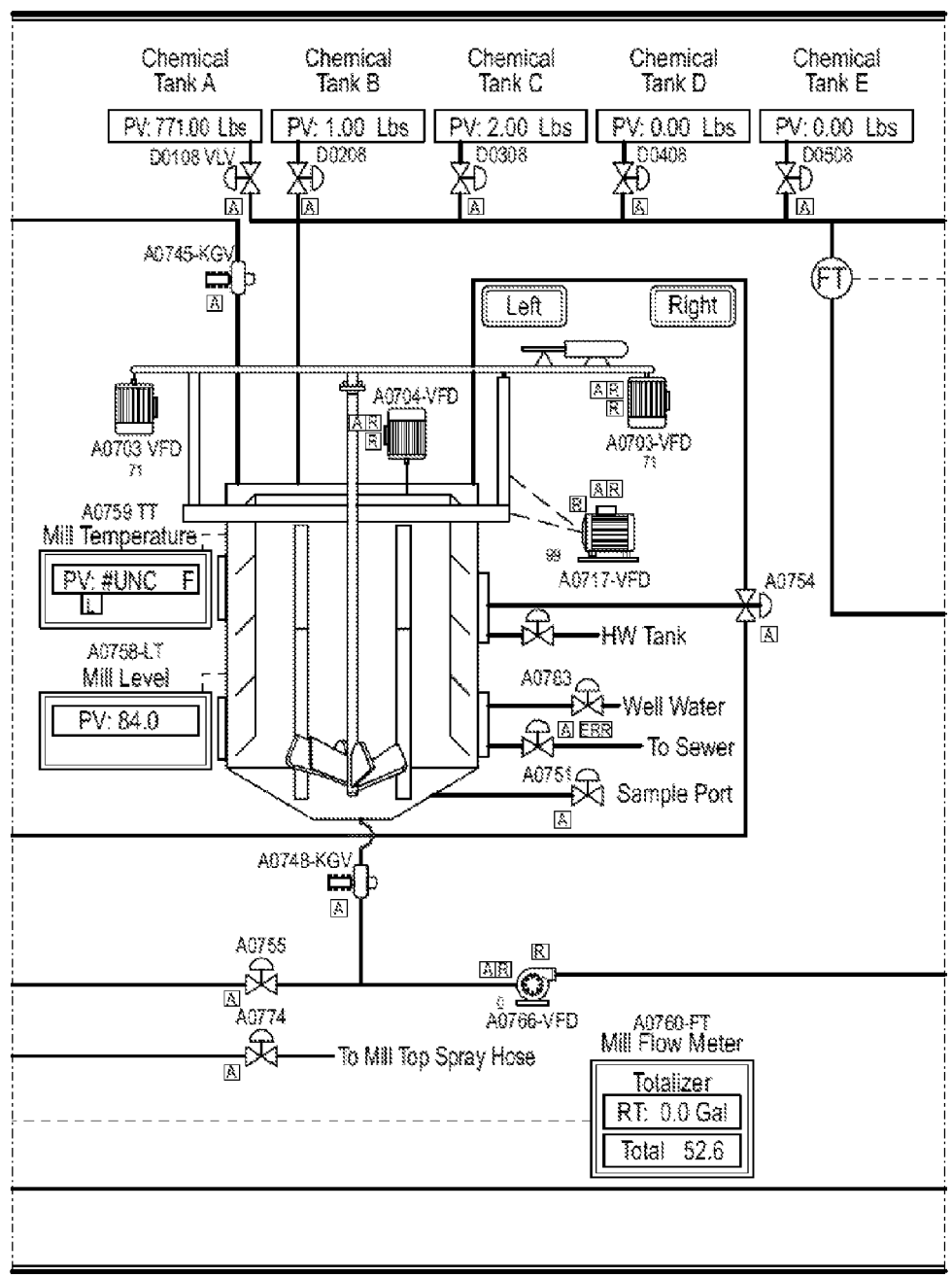
FIG. 15B illustrates a partial view of a control screen view used in a system for removing a coating material from another material.
Figure 15C:
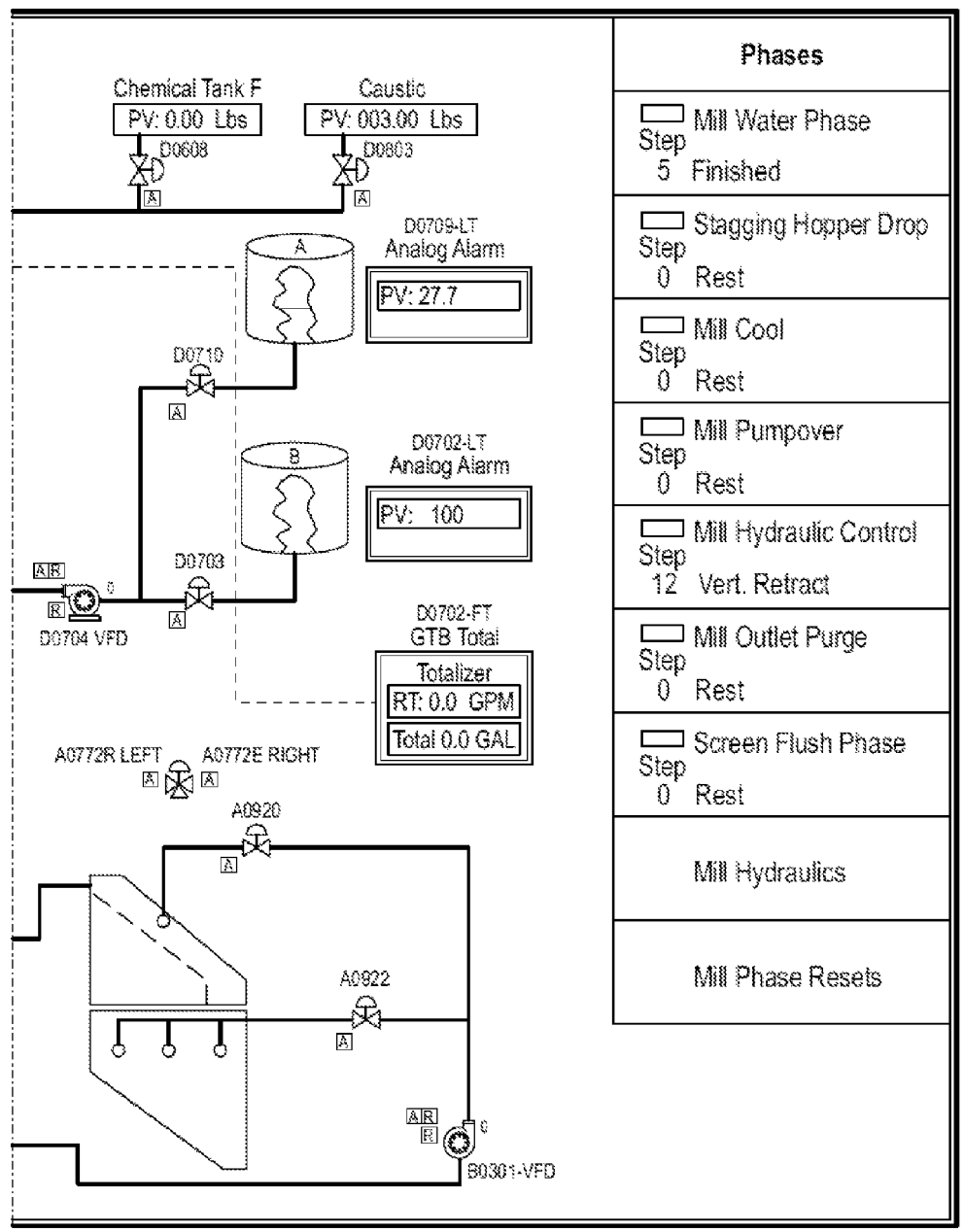
FIG. 15C illustrates a partial view of a control screen view used in a system for removing a coating material from another material.
Figure 16:
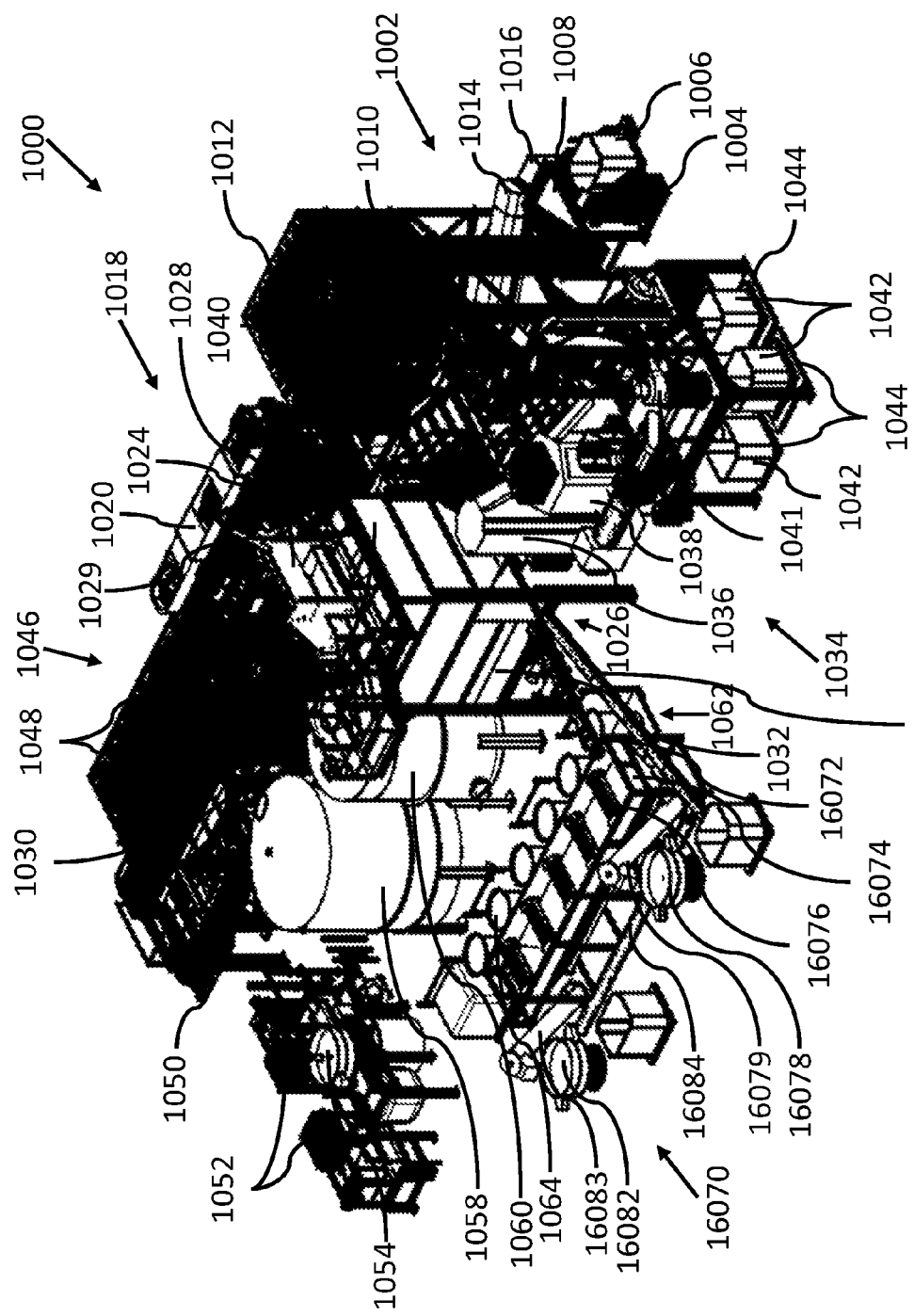
FIG. 16 illustrates a perspective view of a system 1000 for removing a coating material from another material.
Figure 17:
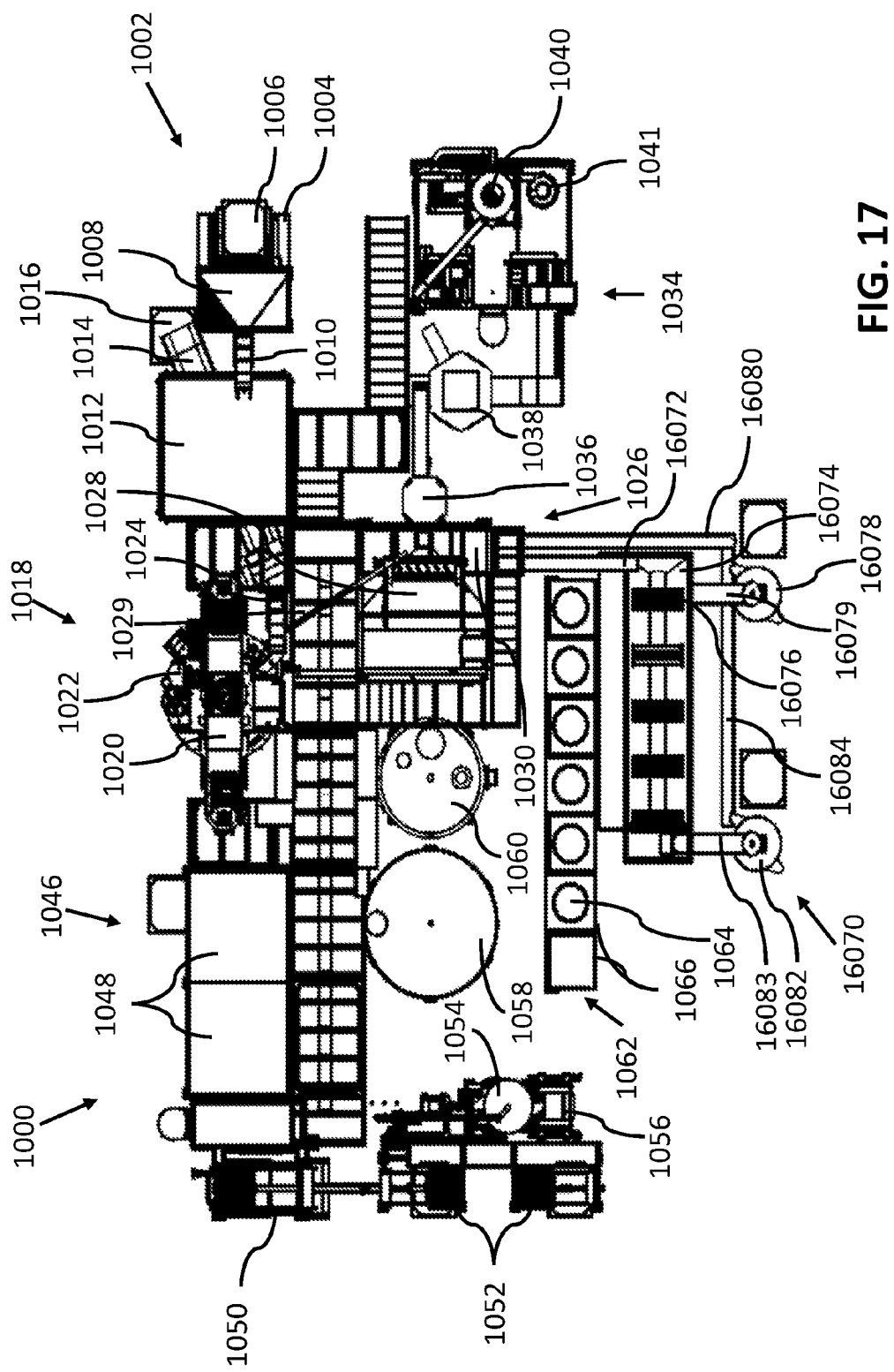
FIG. 17 illustrates a plan view of system 1000 for removing a coating material from another material.
Figure 18:
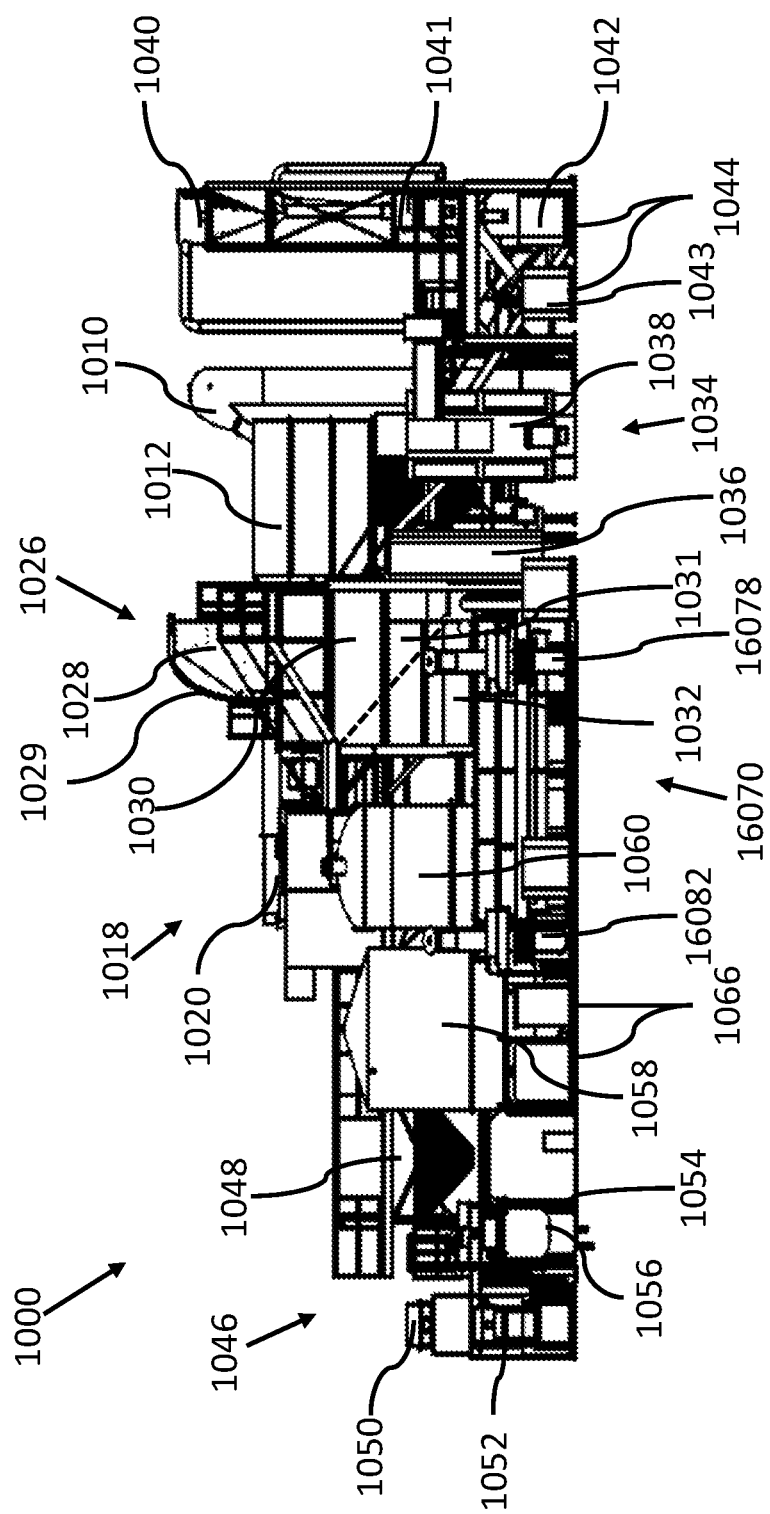
FIG. 18 illustrates a side view of system 1000 for removing a coating material from another material.
Figure 19:
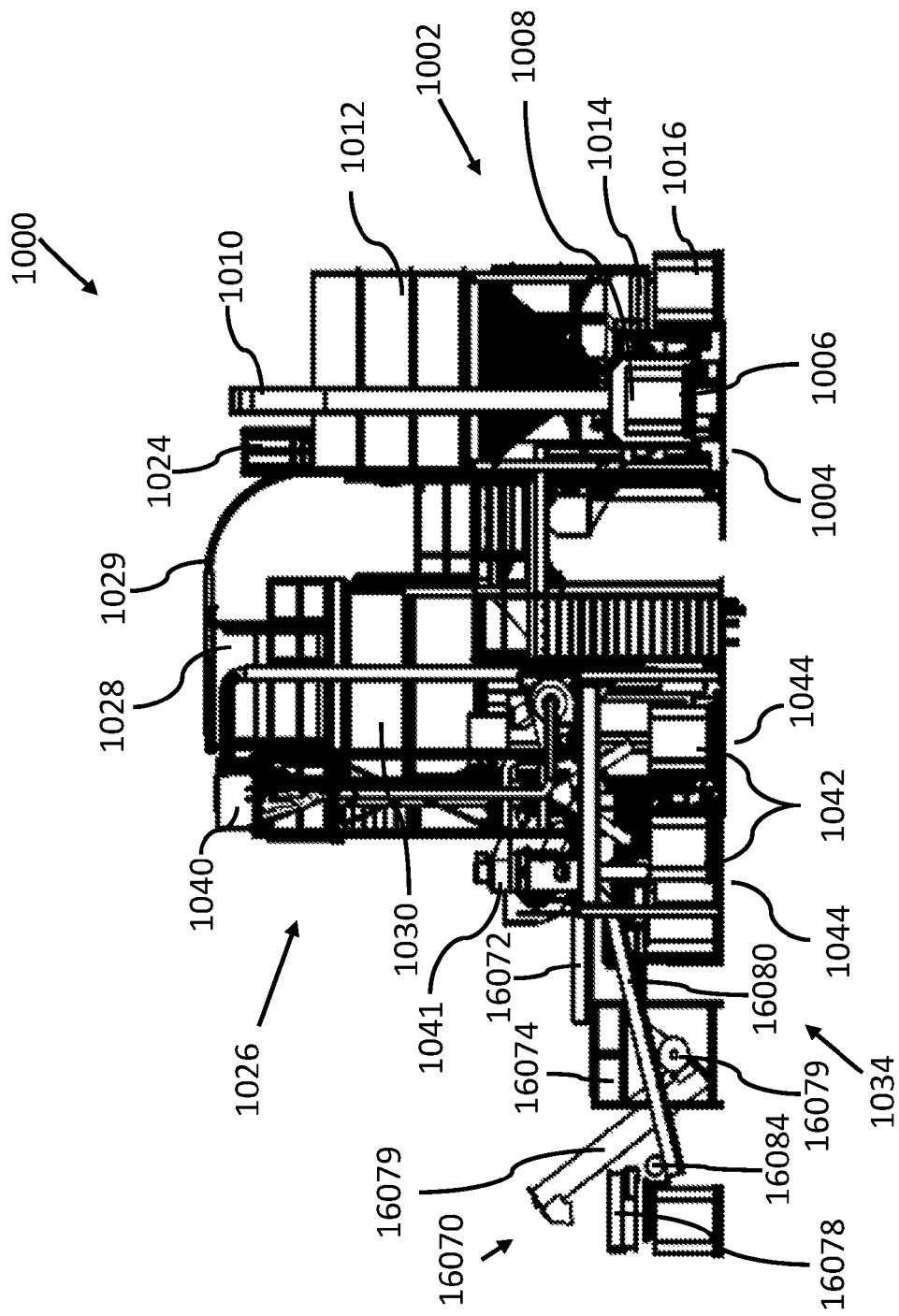
FIG. 19 illustrates another side view of system 1000 for removing a coating material from another material.

FIGS. 15A, 15B, and 15C illustrate partial views of a control screen view used in system 1000 for removing a coating material from another material. FIGS. 15A, 15B, and 15C illustrate the system view allowing a user to monitor various properties of decoating mill 1018, staging hopper 1012, screen station 1026, second elevator 1024, and chemical feed system 1062. Properties include staging hopper 1012 level, second elevator 1024 status, chemical feed system 1062 status and levels, screen station 1026 status, rotary blade position and RPM, valve position, pump status, and the like.

System 1000 additionally includes various platforms, structures, catwalks, and the like to allow system 1000 to be interconnected as necessary, and to maintain the relative positions of various stations during operation of system

1000. System 1000 may be assembled on a site with the intention of system 1000 remaining stationary. Alternatively, system 1000 may be designed so as to be modular in nature, such that system 1000 can be transported via truck or rail and set up at sites as necessary.

FIGS. 16-19 illustrate various views of a system 1000 for removing a coating material from another material. The various views of system 1000 illustrated in FIGS. 16-19 are similar to the various views of system 1000 illustrated in FIGS. 1-4, but with the addition of a water separation station 16070.

In one embodiment, system 1000 may additionally include water separation station 16070. Water separation station 16070 may include a separation tank 16074 holding a liquid, such as, for example, water. It is understood that any liquid with appropriate characteristics may be used in the place of, or in addition to, water.

Decoated material captured in dump hopper 1030 may be directed into separation tank 16074. Decoated material from dump hopper 1030 may be directed into separation tank 16074, including via gravity, a pump, an auger, and the like. Decoated material from dump hopper 1030 may be directed into separation tank 16074 via a pipe 16072.

Material introduced into separation tank 16074 may be conveyed across a surface of the tank via any of a variety of conveyance mechanism, including for example, at least one transverse paddle wheel 16076, a blower, a fluid current, or a combination thereof. Transverse paddle wheels 16076 may rotate and engage material on, near, or beneath the surface of the liquid in separation tank 16074, so as to direct the material and/or liquid along a length of separation tank 16074. In one embodiment, a plurality of paddle wheels 16076 may be oriented along the length of separation tank 16074. In this manner, material on the surface of the liquid within separation tank 16074 may be conveyed from substantially one end of separation tank 16074 to another end of separation tank 16074.

As material within separation tank 16074 is conveyed and agitated by transverse paddle wheels 16076, materials with a density greater than the liquid within separation tank 16074 (e.g., water) will sink to the bottom of separation tank 16074. Materials with a density less than the liquid within separation tank 16074 (e.g., water) will float at or near the surface of the liquid so as to be conveyed by transverse paddle wheels 16076.

Materials that sink to the bottom of separation tank 16074 may be transferred via a conveyer system to a sink screener 16078. The conveyer system may include any of a variety of conveyer systems, including for example an auger 16079, a pump, and the like. Sink screener 16078 may further separate the liquid from materials that sink to the bottom of separation tank 16074, such that these materials may be captured in a container and removed from system 1000. Sink screener 16078 may strain the liquid from materials that sink to the bottom of separation tank 16074. Materials that sink to the bottom of separation tank 16074 may be materials removed from decoated material within system 1000. Materials that sink to the bottom of separation tank 16074 may not be recyclable and may be removed from system 1000. Materials that sink to the bottom of separation tank 16074 may simply be separated from materials that float in separation tank 16074.

Alternatively, materials that are processed and/or dewatered by sink screener 16078 may be transferred to wash station 1034. Materials may be transferred via any of a variety of conveyer systems, including via an auger 16080, a conveyer belt, a pump and pipe, manually by a human or machine, and the like.

Materials with a density less than the liquid within separation tank 16074, and which thus float upon the liquid, may continue across the surface of the liquid until the end of separation tank 16074 is reached. Materials that float in separation tank 16074 may be transferred via a conveyer system to a float screener 16082. The conveyer system may include any of a variety of conveyer systems, including for example an auger 16083, a pump, and the like. Float screener 16082 may separate the liquid from the materials that float in separation tank 16074. Float screener 16082 may strain the liquid from materials that float in separation tank 16074. The dewatered material may be transferred to a container for removal from system 1000. The dewatered material may be transferred via a conveyer system. The conveyer system may include any of a variety of conveyer systems, including for example an auger 16084, a conveyer belt, a pump and pipe, manually by a human or machine, and the like.

Alternatively, dewatered materials that float in the surface in separation tank 16074 may be transferred to wash station 1034 via a conveyer system, including for example, auger 16084.

In one embodiment, the liquid within separation tank 16074 may be a water. In another embodiment, the liquid within separation tank 16074 may be a liquid other than water. The liquid in separation tank 16074 may have a density set by an operator of system 1000. The density of the liquid within separation tank 16074 may be adjusted via any of a variety of mechanisms. For example, salt may be added or removed from the liquid within separation tank 16074 to effect a change in the density of the liquid. In one embodiment, the liquid within separation tank 16074 may be a salt water, and the salinity levels of the salt water may be adjusted as required to obtain proper separation of decoated materials.

By adjusting the density of the liquid, an operator of system 1000 may control which materials float, and which sink, in water separation system 16070. That is, the materials float, and sink, by virtue of the density of the material relative to the density of the liquid medium in which the materials are contained. Accordingly, raising the density of the liquid within separation tank 16074 may result in more materials floating within separation tank 16074. Conversely, lowering the density of the liquid within separation tank 16074 may result in more materials sinking within separation tank 16074. The density of the liquid may be adjusted to obtain a desired separation of decoated materials.

It is understood that materials that float in separation tank 16074 may be materials removed from the decoated material, may be decoated material of a lower density, or both. Likewise, it is understood that materials that sink in separation tank 16074 may be materials removed from the decoated material, may be decoated material of a higher density, or both.

In one embodiment, water separation system 16070 includes at least one of sink screener 16078 and float screener 16082. Water separation system 16070 may include both sink screener 16078 and float screener 16082.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A system for removing a coating material from another material, comprising:
    a staging hopper;
    a second elevator operatively connecting the staging hopper to a decoating mill;
    the decoating mill having a decoating mill tank and at least one rotary blade oriented within the decoating mill tank, wherein the at least one rotary blade can translate horizontally and vertically;
    a screen station having a dump hopper and a recovery tank, the screen station operatively coupled to the decoating mill to receive a decoated slurry from the decoating mill;
    a washer that is operatively coupled to the dump hopper to receive a decoated material from the dump hopper;
    a dryer that is operatively coupled to the washer to receive the decoated material from the washer;
    an aspirator that is operatively coupled to the dryer to receive the decoated material from the dryer and to output the decoated material;
    a large waste water filter press that is operatively coupled to at least one of: the recovery tank and a settling tank, to receive a coating sludge from at least one of: the recovery tank and the settling tank;
    at least one process water filter press that is operatively coupled to at least one of: the large waste water filter press, the washer, the dryer, the recovery tank, and the settling tank, to receive and filter process water from at least one of: the large waste water filter press, the washer, the dryer, the recovery tank, and the settling tank;
    a sanitary water filter that is operatively coupled to at least one of: the large waste water filter press, the washer, the dryer, and the settling tank, to receive and filter water from at least one of: the large waste water filter press, the washer, the dryer, and the settling tank;
    a water separation system that is operatively coupled to at least one of: the washer and the dump hopper to receive decoated material from at least one of: the washer and the dump hopper;
    a staging tank that is operatively coupled to at least one of: the decoating mill, the recovery tank, the washer, a heating tank, and a water tank;
    a water heater operatively coupled to the heating tank to heat contents of the heating tank; and
    a process chemical feed system operatively coupled to the decoating mill to deliver process chemicals to the decoating mill.

2. The system of claim 1, wherein the at least one rotary blade can translate about 45.7 cm relative to the decoating mill tank in a horizontal direction.

3. The system of claim 1, wherein the at least one rotary blade can translate about 121.9 cm relative to the decoating mill tank in a vertical direction.

4. The system of claim 1, wherein the at least one rotary blade includes three rotary blades.

5. The system of claim 1, the screen station further comprising a dewatering screen.

6. The system of claim 1, wherein the dump hopper and the recovery tank are separated from one another by a diagonally-extending wall.

7. The system of claim 1, further comprising a loading hopper operatively connected to the staging hopper by a first elevator.

8. The system of claim 1, wherein the process chemical feed system includes at least one scale.

9. The system of claim 1, wherein the staging hopper is operatively connected to an offloading system.

10. The system of claim 1, wherein the water separation system includes a separation tank having at least one transverse paddle wheel.

11. The system of claim 1, wherein the water separation system includes at least one of a sink screener and a float screener.

12. A system for removing a coating material from another material, comprising:
    a staging hopper;
    a second elevator operatively connecting the staging hopper to a decoating mill;
    the decoating mill having a decoating mill tank and at least one rotary blade oriented within the decoating mill tank;
    a screen station having a dump hopper, a recovery tank, and a dewatering screen, wherein the dump hopper and the recovery tank are separated from one another by a diagonally-extending wall, the screen station operatively coupled to the decoating mill to receive a decoated slurry from the decoating mill;
    a washer that is operatively coupled to the dump hopper to receive a decoated material from the dump hopper;
    a dryer that is operatively coupled to the washer to receive the decoated material from the washer;
    an aspirator that is operatively coupled the dryer to receive the decoated material from the dryer and to output the decoated material;

a large waste water filter press that is operatively coupled to at least one of: the recovery tank and a settling tank, to receive a coating sludge from at least one of: the recovery tank and the settling tank;

at least one process water filter press that is operatively coupled to at least one of: the large waste water filter press, the washer, the dryer, the recovery tank, and the settling tank, to receive and filter process water from at least one of: the large waste water filter press, the washer, the dryer, the recovery tank, and the settling tank;

a sanitary water filter that is operatively coupled to at least one of: the large waste water filter press, the washer, the dryer, and the settling tank, to receive and filter water from at least one of: the large waste water filter press, the washer, the dryer, and the settling tank;

a water separation system that is operatively coupled to at least one of: the washer and the dump hopper, to receive decoated material from at least one of: the washer and the dump hopper;

a staging tank that is operatively coupled to at least one of: the decoating mill, the recovery tank, the washer, a heating tank, and a water tank;

a water heater operatively coupled to the heating tank to heat contents of the heating tank; and a process chemical feed system operatively coupled to the decoating mill to deliver process chemicals to the decoating mill.

13. The system of claim 12, wherein the at least one rotary blade can translate horizontally and vertically.

14. The system of claim 12, wherein the at least one rotary blade can translate about 45.7 cm relative to the decoating mill tank in a horizontal direction.

15. The system of claim 12, wherein the at least one rotary blade can translate about 121.9 cm relative to the decoating mill tank in a vertical direction.

16. The system of claim 12, wherein the at least one rotary blade includes three rotary blades.

17. The system of claim 12, further comprising a loading hopper operatively connected to the staging hopper by a first elevator.

18. The system of claim 12, wherein the staging hopper is operatively connected to an offloading system.

19. The system of claim 12, wherein the at least one rotary blade is operatively connected to a motor, the motor having about 300 hp.

20. The system of claim 12, wherein the water separation system includes a separation tank having at least one transverse paddle wheel.

21. The system of claim 12, wherein the water separation system includes at least one of a sink screener and a float screener.

* * * * *